US010786058B2

(12) United States Patent
Vavrunek

(10) Patent No.: US 10,786,058 B2
(45) Date of Patent: Sep. 29, 2020

(54) CLEANING SLEEVES FOR TOUCHSCREEN ELECTRONIC DEVICES AND METHODS OF USING THE SAME

(71) Applicant: Amy Vavrunek, San Diego, CA (US)

(72) Inventor: Amy Vavrunek, San Diego, CA (US)

( * ) Notice: Subject to any disclaimer, the term of this patent is extended or adjusted under 35 U.S.C. 154(b) by 674 days.

(21) Appl. No.: 15/219,002

(22) Filed: Jul. 25, 2016

(65) Prior Publication Data
US 2017/0020255 A1 Jan. 26, 2017

Related U.S. Application Data

(60) Provisional application No. 62/196,836, filed on Jul. 24, 2015.

(51) Int. Cl.
*A45C 13/00* (2006.01)
*A45C 11/00* (2006.01)
(Continued)

(52) U.S. Cl.
CPC ............ *A45C 13/001* (2013.01); *A45C 11/00* (2013.01); *A45C 13/02* (2013.01); *A47L 25/00* (2013.01);
(Continued)

(58) Field of Classification Search
CPC ....... A45C 11/00; A45C 13/001; A45C 13/02; A45C 2011/002; A45C 2011/003; A45C 2011/025; A47L 25/00
(Continued)

(56) References Cited

U.S. PATENT DOCUMENTS 4,345,336 A * 8/1982 Plastino ................... A42B 3/10
2/171.1
4,951,817 A * 8/1990 Barletta ................... A45F 5/02
206/305
(Continued)

FOREIGN PATENT DOCUMENTS

EP 2103231 A1 9/2009
JP 08-072902 A 3/1996
KR 20-0259081 Y1 12/2001

OTHER PUBLICATIONS

International Search Report and Written Opinion received in related International patent application No. PCT/US2016/043909, dated Oct. 31, 2016, 14 pages.

*Primary Examiner* — Chun Hoi Cheung
(74) *Attorney, Agent, or Firm* — Procopio, Cory, Hargreaves & Savitch LLP; Mark W. Catanese

(57) ABSTRACT

A protective cleaning sleeve is provided which substantially encloses a portable electronic device and which is configured with a narrowed stretchable cuff/opening made from a material that contacts and cleans the portable electronic device when it is being inserted into and removed from the sleeve. The stretchable cuff/opening is configured with a customized width or diameter narrower than a width of the portable electronic device so that it substantially closes around the portable electronic device and provides sufficient friction and contact with a display screen on the portable electronic device when the portable electronic device is being inserted into the sleeve and removed from the sleeve. In this manner, the narrowed stretchable cuff/opening cleans the display screen to remove fingerprints, smudges, oils, dirt and other particles simply by inserting the device into, and removing the device from the protective cleaning sleeve.

32 Claims, 18 Drawing Sheets

(51) Int. Cl.
 A45C 13/02 (2006.01)
 A47L 25/00 (2006.01)
 G06F 1/16 (2006.01)
 B08B 1/00 (2006.01)
(52) U.S. Cl.
 CPC .............. *B08B 1/00* (2013.01); *G06F 1/1628* (2013.01); *A45C 2011/002* (2013.01); *A45C 2011/003* (2013.01); *A45C 2013/025* (2013.01)
(58) Field of Classification Search
 USPC .................... 206/320, 305; 150/154; 383/118
 See application file for complete search history.

(56) References Cited

U.S. PATENT DOCUMENTS

| | | | | |
|---|---|---|---|---|
| 5,207,323 A * | 5/1993 | McConnell | ............ | A63C 11/00 150/154 |
| 5,316,141 A * | 5/1994 | Jalomo | ................... | B65D 5/20 150/128 |
| 6,581,760 B1 * | 6/2003 | Robertson | ............. | A45C 11/04 206/320 |
| 6,711,752 B2 * | 3/2004 | Smith | ................... | A42B 3/006 150/154 |
| D533,347 S * | 12/2006 | Andre | ............. | D3/303 |
| 8,550,713 B2 * | 10/2013 | Schwarz | ............... | B65D 33/04 383/106 |
| 8,590,698 B1 * | 11/2013 | Osborne | ................ | A45C 11/04 206/38 |
| 8,961,015 B1 * | 2/2015 | Bihn | ..................... | A45C 3/001 383/105 |
| 2003/0062278 A1 * | 4/2003 | Bean | ..................... | A45C 11/00 206/349 |
| 2004/0188318 A1 * | 9/2004 | Fellows | ............... | B65H 75/362 206/702 |
| 2005/0161352 A1 * | 7/2005 | Huddleston | ............ | A45C 11/00 206/320 |
| 2005/0258057 A1 * | 11/2005 | Gelphman | .............. | A45C 13/02 206/320 |
| 2011/0272305 A1 * | 11/2011 | Lee | .......................... | A45C 5/03 206/320 |
| 2012/0138490 A1 * | 6/2012 | Hollander | .............. | A45C 11/00 206/205 |
| 2015/0143648 A1 * | 5/2015 | Batey | ..................... | A45C 11/00 15/104.93 |

\* cited by examiner

CLEANING SLEEVES FOR TOUCHSCREEN ELECTRONIC DEVICES AND METHODS OF USING THE SAME

PRIORITY CLAIM AND RELATED PATENT APPLICATIONS

This patent document claims benefit of priority under 35 U.S.C. 119(e) to U.S. Provisional Patent Application No. 62/196,836 entitled "Cleaning sleeve for touchscreen electronic devices and method of using the same" and filed on Jul. 24, 2015. The disclosures of the above application are incorporated by reference in their entirety as a part of this document.

BACKGROUND

Field of the Invention

This patent document generally relates to a protective sleeve for substantially enclosing a portable electronic device, and more particularly to a protective sleeve for cleaning a touchscreen of the portable electronic device, and various methods for its use.

Related Art

Protective sleeves and cases for portable electronic devices such as laptops, tablets, and smartphones are numerous and vary widely in shape, size, material and function. Most sleeves are designed at least to protect the portable electronic device from external damage, whether it is scratches, hard impacts such as drops, or just general contact, as such, protective sleeves are limited primarily to simply protecting the portable electronic device when it is not in use.

Many portable electronic devices, specifically touchscreen devices can become dirty when they are being used as a result of a user's fingers touching the screen or the screen coming in contact with dirt or other particles. Conventional techniques to clean a touchscreen involve wiping the screen clean with a cloth, such as a microfiber or cleaning cloth, which attracts the oils, dirt and other particles which are deposited on the touchscreen during use; however, these techniques require carrying around a separate cloth to clean the touchscreen. Furthermore, a flat, one-sided cloth may be somewhat difficult to hold and apply to the touchscreen.

SUMMARY

Embodiments described herein provide for a protective cleaning sleeve which substantially encloses a portable electronic device and which is configured with a narrowed stretchable cuff/opening made from a material that stretches and/or contacts. In certain embodiments, surfaces of the sleeve can be constructed such that it cleans the portable electronic device when the device is being inserted into and removed from the sleeve. The cuff/opening can be configured with a customized width or diameter narrower than a width of the portable electronic device.

According to one aspect, a protective cleaning sleeve for a portable electronic device includes: an elastic protective pouch with a first width; and an elastic opening with a second width on one end the protective pouch, wherein the second width is smaller than the first width, and wherein the elastic opening includes a material which cleans a surface of the portable electronic device.

The sleeve itself may be made from one material on an outside surface that allows the outside surface to be highly ornamental while a material on an inside surface may be selected such that it can be used to clean the portable electronic device by manual application of the interior surface to the display screen. The material on the outside surface can be more or less durable than the material on the inside surface.

The sleeve can be designed to be turned inside out and used as a cleaning mitt where a user may place a hand inside the sleeve, so that it is easier to apply the cleaning surface to the portable electronic device.

The sleeve may also be configured with one or more accessories, for example an elastic loop for retaining a cable, charging plug, a tie-on loop, and an external pocket for a pen or a stylus.

BRIEF DESCRIPTION OF THE DRAWINGS

The structure and operation of the present invention will be understood from a review of the following detailed description and the accompanying drawings in which like reference numerals refer to like parts and in which.

Figure 1:
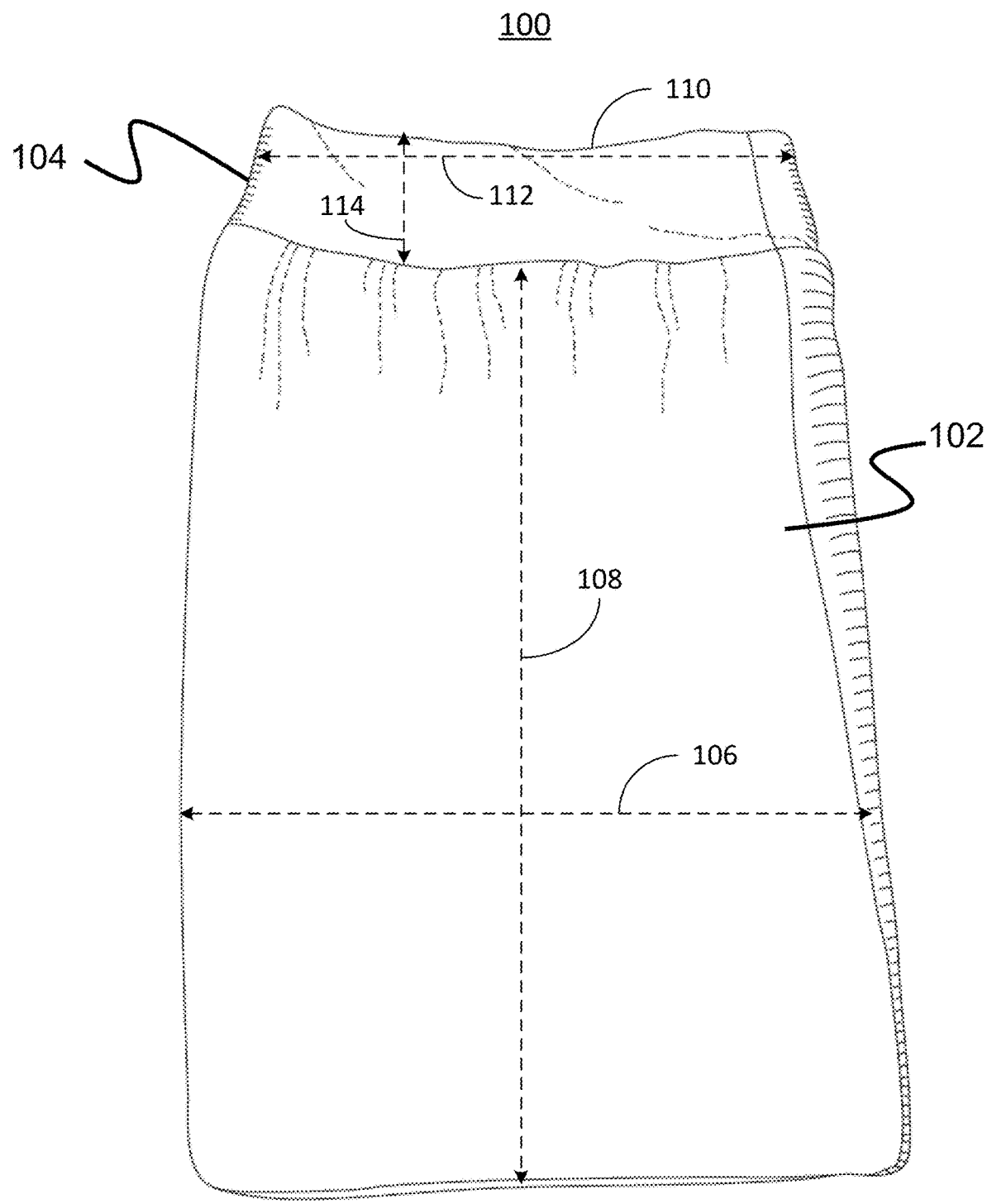
FIG. 1 illustrates an exemplary protective cleaning sleeve in accordance with some embodiments described herein.

Table 1 presents a list of fabric materials, which may be used to make the protective cleaning sleeve and exemplary compositions in accordance with some embodiments, described herein.

Table 2 presents a list of exemplary material compositions and dimensions of exemplary protective cleaning sleeves for small-size tablet devices in accordance with some embodiments described herein.

Table 3 presents a list of exemplary material compositions and dimensions of exemplary protective cleaning sleeves for large-size tablet devices in accordance with some embodiments described herein.

Table 4 presents a list of exemplary material compositions and dimension of exemplary protective cleaning sleeves, which are customized for a line of ASUS tablet devices in accordance with some embodiments described herein.

DETAILED DESCRIPTION

Certain embodiments disclosed herein provide for a protective cleaning sleeve that substantially encloses a portable electronic device (with or without a third party case/keyboard/stand) and that includes a narrowed stretchable cuff/opening. In some embodiments, the stretchable cuff/opening of the disclosed protective cleaning sleeve is configured with a customized width or diameter narrower than a width of the portable electronic device so that the sleeve substantially closes around the portable electronic device and provides sufficient friction to prevent the device from slipping back out of the sleeve. In this way, no closing mechanism, such as a synch of tie is required. This lowers cost, makes the sleeve easier to produce, and easier to use.

In one embodiment, a protective cleaning sleeve for a portable electronic device includes: an elastic protective pouch with a first width; and an elastic opening with a second width on one end of the protective pouch, wherein the second width is smaller than the first width. The sleeve itself can be made from one material on an outside surface that is more durable while a material on an inside surface can be more protective of the portable electronic device. The interior surface material can also be a cleaning material that operates to clean the device by manual application of the interior surface to the display screen. The sleeve can also be designed to be turned inside out and used as a cleaning mitt where a user may place a hand inside the sleeve, so that it is easier to apply the cleaning surface to the portable electronic device. In some embodiments, the sleeve can also be configured with one or more accessories, for example an elastic loop for retaining a cable, charging plug, a tie-on loop, and an external pocket for a pen, stylus, or other accessory or device.

In another aspect, a protective cleaning sleeve for a portable electronic device is disclosed. This protective cleaning sleeve includes a protective pouch having a first width and a stretchable cuff attached to an open end of the protective pouch at a first end of the stretchable cuff and having an elastic opening at a second end of the stretchable cuff, wherein the elastic opening has a second width smaller than the first width. Moreover, the stretchable cuff includes a material having cleaning properties, and hence the stretchable cuff can be used to clean a surface of the device. The cuff can also be configured such that it cleans a surface of the portable electronic device when the portable electronic device is being inserted into or removed from the protective pouch through the elastic opening In a further aspect, a device for storing and cleaning a portable electronic device is disclosed. This device includes a pouch comprising a first panel and a second panel, wherein the pouch has an opening and a first width, which is substantially equal to the width of the portable electronic device. The device also includes a stretchable cuff comprising a first half cuff and a second half cuff and attached to the opening of the pouch, wherein the stretchable cuff has an elastic opening that has a second width substantially smaller than the width of the portable electronic device. Furthermore, the first panel of the pouch and the first half cuff form a first side of the pouch and the second panel of the pouch and the second half cuff form a second side of the pouch. Moreover, the first half cuff is made from a first fabric having cleaning properties so that the inner surface of the first half cuff can clean a surface of the portable electronic device.

FIG. 1 illustrates an exemplary protective cleaning sleeve 100 in accordance with an example embodiment described herein. As can be seen in FIG. 1, sleeve 100 includes a pouch 102 which can be used to substantially enclose a portable electronic device such as a tablet or smartphone, and a cuff 104 having an opening 110 where the portable electronic device can be inserted and removed from pouch 102. Note that a width 112 of opening 110 is narrower than a width 106 of pouch 102.

Pouch 102 can primarily comprise two panels, i.e., a front panel and a back panel which may be sewn together on three sides of the two panels, i.e., the left, the right and the bottom sides as shown in FIG. 1. In other embodiments, pouch 102 is made from a single panel that is folded into a front panel and a back panel and that is then sewn together along two sides to form pouch 102. Pouch 102 may be configured with width 106 and a height 108 to comfortably fit a target portable electronic device, such as a tablet or a smartphone. Dimensions of some exemplary pouches are described below with regard to FIG. 2.

Pouch 102 can be formed from a single layer of fabric, which is soft, elastic and provides cleaning properties when the fabric makes contact with the surface of the portable electronic device. In some embodiments, a fabric such as French terry (also referred to as "terry cloth") can be used to make a single layer pouch, as this fabric has a smooth surface (for the outside of the pouch) and a nubby/terry surface on the inside. Other fabrics that can be used for the single layer design can include micro-suede, terry velour, bamboo, rayon jersey or any other fabric that is stretchable and useful for cleaning. In one embodiment, the fabric contains approximately 2% or more of stretchable material such as Lycra™, Elastane™, or other types of spandex. In another embodiment, the fabric contains between 0.5%-50% of stretchable material such as Lycra™, Elastane™, or other types of spandex. In yet another embodiment, the fabric contains between 0.01%-99% of stretchable material such as Lycra™, Elastane™, or other types of spandex. Note that the fabric can have either a 2-way (i.e., one-dimensional) or a 4-way (i.e., two-directional) stretch properties.

In some embodiments, the pouch can include at least two layers of materials: an outer layer that can provide a more durable surface to protect the portable electronic device inside sleeve 100 and to protect the sleeve from wear and tear, and an inner layer comprising a stretchable fabric that can provide a cleaning function. In such embodiments, the outer layer can also be formed with a material such as a fabric capable of being decorated or embellished in order to personalize the sleeve for the user. In some embodiments, the outer layer of pouch 102 can even include leather. Note that the outer layer material does not have to be stretchable.

The inner layer material can include terry cloth, microfiber, micro-suede, terry velour, bamboo, rayon jersey or any other fabric that is useful for cleaning (including both overall surface cleaning and spot-cleaning) the surfaces of portable electronic devices, and particularly for the glass surfaces and other touchscreen surfaces. In one embodiment, each of the outer layer and inner layer contains approximately at least 2% or more of stretchable material such as Lycra™, Elastane™, or other types of spandex. In another embodiment, each of the outer layer and inner layer contain approximately 0.5%-50% of stretchable material such as Lycra™, Elastane™, or other types of spandex. In yet another embodiment, each of the outer layer and inner layer contain approximately 0.01%-99% of stretchable material such as Lycra™, Elastane™, or other types of spandex.

Note that pouch 102 can be made from a fabric that is stretchable but does not contain spandex. This stretch property can be achieved by cutting on the bias of the fabric, which is when the fabric's warp and weft threads are at an angle, such as 45 degrees to the fabric's major seam lines. Typically, woven fabric is more elastic as well as more fluid in the bias direction, compared to the straight and cross grains. Using a fabric that is cut on the bias for the pouch material allows the fabric to provide a necessary amount of stretch without having to contain stretchable material such as Lycra™, Elastane™, or other types of spandex.

In some embodiments, pouch 102 is made of different materials on different portions of pouch 102. For example, one portion of pouch 102 can be made from a stretchable material, while the other portion can be made from a material with little or no stretch ability. Furthermore, the stretchable portion of pouch 102 can be formed from either a single layer of material or two layers of materials including an inner layer and an outer layer. If a single layer of material is used for the stretchable portion of pouch 102, the single layer of material can be a soft, elastic material having cleaning properties thereby providing a cleaning function when the material is making contact with the surface of the portable electronic device. If two layers of materials are used for the stretchable portion of pouch 102, the outer layer can be formed from a material to provide a more durable surface, while the inner layer can be formed to include a material which is soft and elastic having cleaning properties thereby providing a cleaning function when the material is making contact with the surface of the portable electronic device.

In one embodiment, the stretchable portion of pouch 102 should be at least half of the total surface area of pouch 102. For example, in a two-panel configuration of pouch 102, the stretchable portion can be one of the two panels. On the other hand, the non-stretchable portion of pouch 102 can be formed from a rigid material, a semi-rigid material such as grass cloth or other semi-rigid materials. Moreover, the non-stretchable portion of pouch 102 can be decorated or embellished for personalizing the sleeve for the user.

Note that, when the inner layer of the two-layer construction of pouch 102 is configured with cleaning properties, a user can manipulate the pouch portion of protective cleaning sleeve 100 against the portable electronic device when the device is substantially enclosed by the sleeve 100 to clean and spot-clean the touchscreen and other surfaces of the portable electronic device. For the embodiments of the single-layer construction of pouch 102, if the single-layer material is configured with cleaning properties, the above-described cleaning technique for an enclosed portable electronic device can be similarly applied to clean the portable electronic device.

In another embodiment, the sleeve 100 can be turned inside out and used as a cleaning cloth mitt on the portable electronic device, where the user places a hand inside the inside-out pouch 102. In this embodiment, pouch 102 can be configured with dimensions to substantially cover a user's hand or fingers (depending on the overall size of the sleeve) and therefore make it easier to manually clean a surface of the portable electronic device than just using a flat, square cleaning cloth.

In the embodiment shown in FIG. 1, sleeve 100 also includes a cuff 104 on one end of sleeve 100. As can be seen in FIG. 1, cuff 104 is attached to the top edge of pouch 102 on one side and has an opening 110 on the other side for a portable electronic device to be inserted into and removed from pouch 102. In one embodiment, cuff 104 is formed from an elastic material, such as Lycra™ or Elastane™, and is configured with width 112 at opening 110 that is narrower than width 106 of pouch 102. As can be seen in FIG. 1, width 112 of cuff 104 is made sufficiently narrow to retain the portable electronic device securely within sleeve 100. Moreover, width 112 of cuff 104 also allows the inner surface of cuff 104 to make frictional contact with the surface of the portable electronic device when the portable electronic device is being inserted into or removed from pouch 102. Width 112 can be determined based on the specific dimensions of the portable electronic device to be enclosed to ensure that cuff 104 can expand to accommodate the width of the portable electronic device.

In certain embodiments, width 112 of cuff 104 can be configured to allow the material of cuff 104 to provide sufficient frictional contact with the surface of the portable electronic device to at least partially remove any smudges, fingerprints, dirt or other particles on the portable electronic device.

In some embodiments, the height 114 of cuff 104 should have a minimum dimension to provide a significant amount of contact with the portable electronic device when the portable electronic device passes through opening 110 in either direction.

In some embodiments, cuff 104 is formed from a single layer of fabric that is soft, stretchable and has cleaning properties to provide a cleaning function when the fabric is making contact with the surface of the portable electronic device. The single layer of fabric can include terry cloth, microfiber, micro-suede, terry velour, bamboo, rayon jersey or any other fabric which is stretchable and useful for cleaning (including both overall cleaning and spot-cleaning) the surfaces of portable electronic devices. In other embodiments, cuff 104 can include two layers of materials: an outer layer that is made of a stretchable fabric and that can have cleaning properties, and an inner layer that is made of a stretchable fabric that has cleaning properties to provide a cleaning function when the fabric is making contact with the surface of the portable electronic device. The inner layer fabric can include terry cloth, microfiber, micro-suede, terry velour, bamboo, rayon jersey or any other fabric, which is useful for cleaning (including both overall cleaning and spot-cleaning) the surfaces of portable electronic devices. As mentioned above, cuff 104 can be made of a fabric that is cut on the bias to allow the fabric to provide sufficient stretch without having to contain stretchable material such as Lycra™, Elastane™, or other types of spandex.

In some embodiments, one portion of cuff 104 can be made by a stretchable fabric having cleaning properties while the other portion of cuff 104 can be made by a stretchable fabric without cleaning properties. Furthermore, the portion of cuff 104 having the cleaning properties can be formed from either a single layer of material or two layers of materials including an inner layer and an outer layer. If a single layer of material is used for the portion of cuff 104 having the cleaning properties, the single layer of material provides a cleaning function when the material is making contact with the surface of the portable electronic device. If two layers of materials are used for the portion of cuff 104 having the cleaning properties, the outer layer may be formed from a stretchable material without cleaning properties, while the inner layer may be formed from a stretchable material having cleaning properties to provide a cleaning function when the material is making contact with the surface of the portable electronic device. The portion of cuff 104 having the cleaning properties should be at least half of the total surface area of cuff 104.

In some embodiments, a portion of the outside surface, an entirely side of the outside surface, or the entire outside surface of pouch 102 can be made of one or more materials having cleaning properties. In some other embodiments, a portion of the outside surface, an entirely side of the outside surface, or the entire outside surface of cuff 104 can be made of one or more materials having cleaning properties. In yet some other embodiments, a portion of the outside surface, an entirely side of the outside surface, or the entire outside surface of sleeve 100 can be made of one or materials having cleaning properties. Hence, sleeve 200 can have cleaning materials on both the interior surface and the exterior surface. In some embodiments, sleeve 100 is made entirely with bamboo fabric which is considered a cleaning material. In some other embodiments, sleeve 100 includes half microfiber interior and half microsuede exterior, and as a result, sleeve 100 can be used for cleaning with either the interior or the exterior. Sleeve 100 can also be made entirely with a cleaning material on the interior using microsuede or microfiber without stretch in the cleaning material, wherein the cleaning material is cut on a bias.

In one embodiment, width 112 of cuff 104 at opening 110 can be determined based on a ratio of width 106 of pouch 102 to width 112 of cuff 104. This ratio allows the sleeve 100 to be customized for any sized portable electronic device to be placed inside the sleeve by determining an ideal width 112 for cuff 104 after width 106 of pouch 102 is determined for a given sized portable electronic device. In this manner, desirable dimensions of the sleeve 100 can be achieved to ensure that the device does not fall out of sleeve 100. In one example, sleeve 100 has a width ratio range of approximately 15:11 (or 1.36) to approximately 13:9 (or 1.44). In this example, an exemplary sleeve having a ratio of 15:11 and a pouch width of 7.5 inches will have a cuff width of about 5.5 inches, while an exemplary sleeve having a ratio of 13:9 and a pouch width of 6.5 inches will have a cuff width of about 4.5 inches. In some embodiments, the ratio of width 106 of pouch 102 to width 112 of cuff 104 may be determined based on the material or materials that cuff 104 and pouch 102 are made of. For example, if cuff 104 is formed from a more stretchable material, the width ratio can be made to be at the higher end of the range of possible ratios, for example, close to 1.44. In some embodiments, width 112 of cuff 104 at opening 110 can range from 3"-8", and an actual width value within this range can be determined based on the size of pouch 102, amount of stretch in the fabric of cuff 104, and composition of materials in pouch 102 and cuff 104.

Table 1 presents a list of fabric materials, which may be used to make the protective cleaning sleeve 100 and exemplary compositions in accordance with some embodiments, described herein. As can be seen from the Table 1 below, each of the listed fabric contains a particular percentage of spandex thereby making them stretchable to various extents. Note that each of the fabric listed below may be used for both pouch 102 and cuff 104 of sleeve 100.

TABLE 1

Sleeve Fabric Options with Stretchable Material Percentages

| Fabric | Bamboo/Viscose/Rayon/Polyester | Spandex | Cotton |
| --- | --- | --- | --- |
| Knit | 93% | 7% | |
| | 94% | 6% | |
| Jersey | 92% | 8% | |
| | 95% | 5% | |
| | 70% | 5% | 25% |
| | 60% | 3% | 27% |
| French Terry | 94% | 6% | |
| | 70% | 30% | |
| Cotton | | 92% | 8% |

Figure 2:
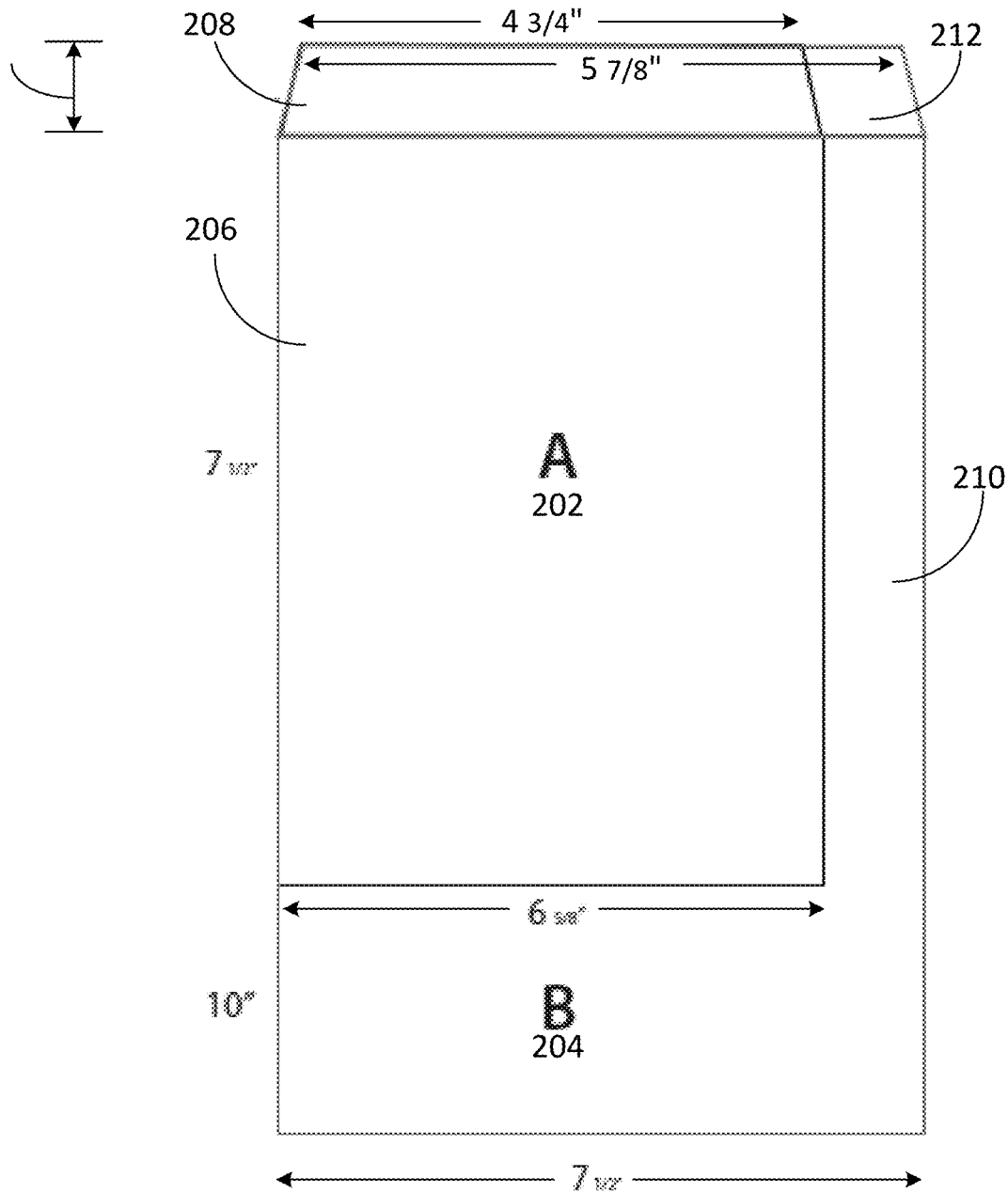
FIG. 2 illustrates various exemplary sizes of the disclosed protective cleaning sleeve in accordance with some embodiments described herein.

FIG. 2 illustrates various exemplary sizes of the disclosed protective cleaning sleeve 100 in accordance with some embodiments described herein. More specifically, FIG. 2 shows a smaller sleeve 202 (A) designed for a 7-inch portable electronic device such as a 7-inch tablet and a larger sleeve 204 (B) designed for a 10-inch portable electronic device such as a 10-inch tablet. As can be seen in FIG. 2, for the smaller sleeve 202, the pouch 206 of sleeve 202 has a width of approximately 6⅝ inches, while cuff 208 of sleeve 202 has a width at the opening of approximately 4¾ inches. For the larger sleeve 204, the pouch 210 has a width of approximately 7½ inches, while the cuff 212 of sleeve 204 has a width at the opening of approximately 5⅞ inches. In each of the exemplary sleeves above, the cuff portion of the sleeves should have a sufficient height to provide a significant amount of contact with the portable electronic device when the portable electronic device passes through the associated openings. In the embodiments shown in FIG. 2, the heights of cuff 208 and cuff 212 are both approximately 1⅜ inches; however, other heights greater or smaller than 1⅜ inches can be used in other embodiments.

Figure 3:
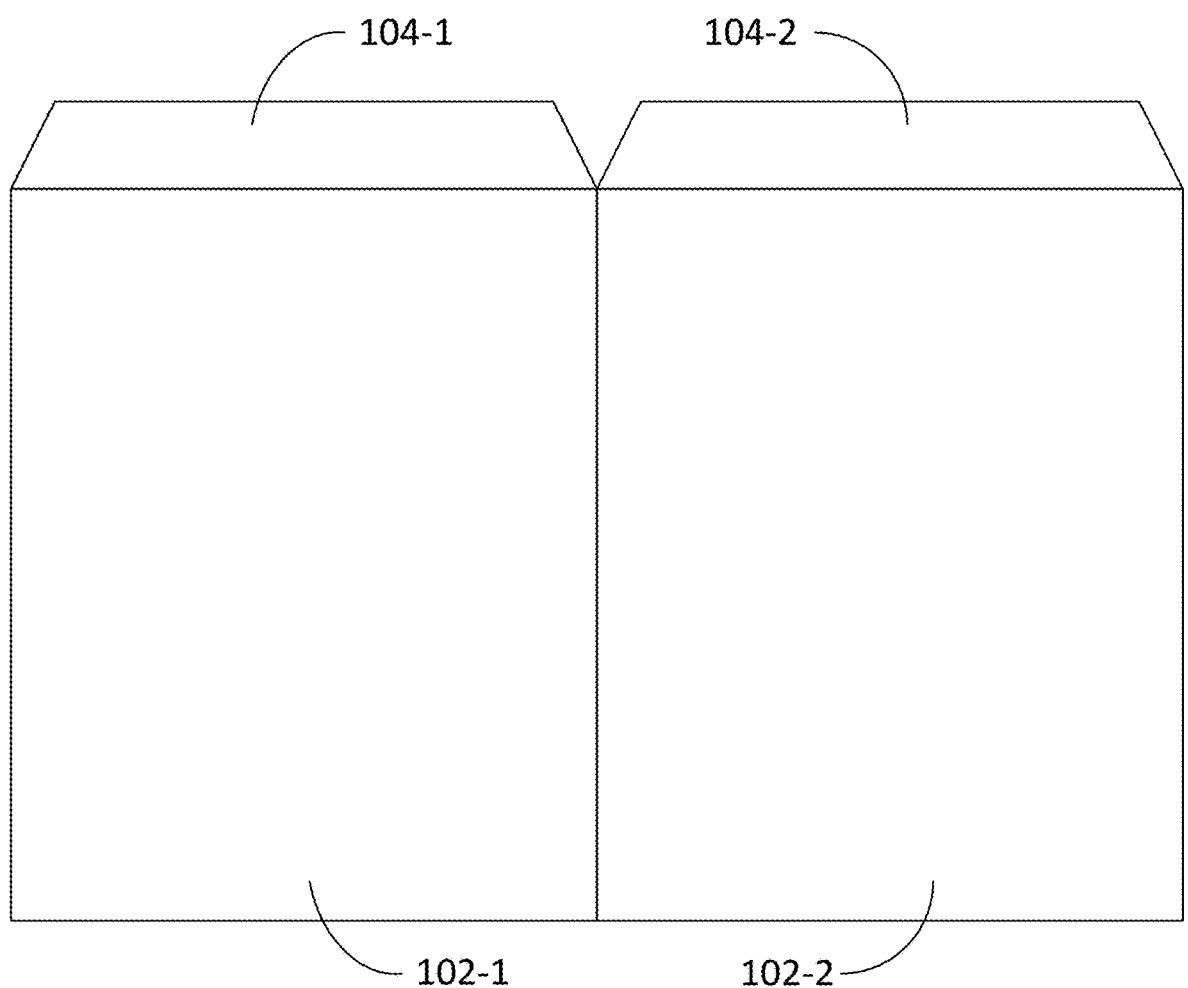
FIG. 3 shows a schematic of the disclosed protective cleaning sleeve which is cut open along seams to demonstrate various exemplary material configurations for the protective cleaning sleeve in accordance with some embodiments described herein

FIG. 3 shows a schematic of protective cleaning sleeve 100 that is cut open along seams to demonstrate various exemplary material configurations for protective cleaning sleeve 100 in accordance with some embodiments described herein. As can be seen in FIG. 3, sleeve 102 has been separated into two halves, i.e., a left half sleeve including left half pouch 102-1 plus left half cuff 102-1, and right half pouch 102-2 and right half cuff 104-2. Because each of pouch 102 and cuff 104 can be configured in a two-layer configuration, the following discussion of the material composition refers to either a single layer configuration of protective cleaning sleeve 100 or the interior/inner layer material composition of a two-layer configuration of protective cleaning sleeve 100.

In some embodiments, entire cuff 104 (i.e., both left half cuff 104-1 and right half cuff 104-2) is made from a fabric having desired cleaning properties, such as microfiber. In these embodiments, pouch 102 can be made from a stretchable fabric other than microfiber, such as bamboo. In some embodiments, only half of sleeve 100 is made from a fabric having desired cleaning properties, such as microfiber, wherein the half of sleeve 100 with cleaning properties can be either left half cuff 104-1 plus left half pouch 102-1, or right half cuff 104-2 plus right half pouch 102-2. In these embodiments, the other half of sleeve 100 can be made from a stretchable fabric other than microfiber, such as bamboo. In some other embodiments, only half of cuff 104 (i.e., either left half cuff 104-1 or right half cuff 104-2) is made from a fabric having desired cleaning properties, such as microfiber. In these embodiments, the rest of sleeve 100 other than the half of cuff 104 having cleaning properties can be made from a stretchable fabric other than microfiber, such as bamboo. In still other embodiments, up to ¾ but no more than ¾ of entire sleeve 100 is made from a fabric having desired cleaning properties, such as microfiber, while the remaining portion of no less than ¼ of sleeve 100 is made from a stretchable fabric other than microfiber, such as bamboo. And in still other embodiments just pouch 102-1 or 102-2 can be made of fabric having the desired cleaning properties.

Table 2 presents a list of exemplary material compositions and dimensions of exemplary protective cleaning sleeves for small-size tablet devices in accordance with some embodiments described herein. As can be seen from the Table 2 below, the first exemplary sleeve is made entirely from bamboo fabric, the second exemplary sleeve is made from bamboo in the entire pouch portion and half of the cuff portion, while other half of the cuff portion is made from microfiber. In the third exemplary sleeve half of the pouch portion and half of the cuff portion are made from bamboo fiber, while other half of the pouch portion and the other half of cuff portion are made from microfiber.

TABLE 2

Small Sleeve Dimensions and Compositions

| Fabric Interior | Width of Pouch | Length of Pouch | Width of Cuff |
|---|---|---|---|
| All bamboo | 5.5 | 8.25 | 3.25 |
| Bamboo with ½ cuff in microfiber | 5.5 | 8.25 | 5 |
| ½ bamboo/½ microfiber Body and cuff | 5.75 | 8.5 | 5 |
| Fabric with extra stretch take cuff width down ¼ inch | 5.75 | 8.5 | 4.75 |

Similarly, Table 3 presents a list of exemplary material compositions and dimensions of exemplary protective cleaning sleeves for large-size tablet devices in accordance with some embodiments described herein.

TABLE 3

Large Sleeve Dimensions and Compositions

| Fabric Interior | Width of Pouch | Length of Pouch | Width of Cuff |
|---|---|---|---|
| All bamboo | 7.5 | 10.25 | 4.25 |
| Bamboo with ½ cuff in microfiber | 7.5 | 10.25 | 6 |
| ½ bamboo/½ microfiber Body and cuff | 7.75 | 10.5 | 6 |
| Fabric with extra stretch take cuff width down ¼ inch | 7.25 | 10.5 | 5.75 |

Note that while Tables 2 and 3 listed various exemplary dimensions of the exemplary protective cleaning sleeves for small-size tablets and large-size tablets, other embodiments of the exemplary protective cleaning sleeves can have dimensions smaller than the ones listed in Table 2 to accommodate even smaller devices such as smartphones or dimensions larger than the ones listed in Table 3 to accommodate even larger devices such as laptop computers.

Table 4 presents a list of exemplary material compositions and dimension of exemplary protective cleaning sleeves which are customized for a line of ASUS tablet devices in accordance with some embodiments described herein.

TABLE 4

Customized Sleeve Dimensions and Compositions

| Fabric Interior | Width of Pouch | Length of Pouch | Width of Cuff |
|---|---|---|---|
| All bamboo | 4.75 | 8.25 | 3.5 |
| Bamboo with ½ cuff in microfiber | 4.75 | 8.25 | 4.25 |
| ½ bamboo/½ microfiber Body and cuff | 5 | 8.25 | 4.5 |
| Fabric with extra stretch take cuff width down ¼ inch | 5 | 8.25 | 4.25 |

In one embodiment, inserting the portable electronic device into the disclosed protective cleaning sleeve, such as sleeve 100, requires expanding the width of the elastic opening of the cuff as the portable electronic device passes through the opening and makes contact with an inner surface of cuff with at least one surface of the portable electronic device. Hence, when the inner surface of the cuff contacting the surface of the portable electronic device has clean properties, the insertion operation can also clean the surface of the portable electronic device. When the portable electronic device is fully inserted into the pouch of the sleeve, the opening of the cuff reverts to its un-expanded configuration and substantially encloses the portable electronic device within the sleeve to substantially secure the portable electronic device within the sleeve. Once the portable electronic device is enclosed within the sleeve, a user may further manipulate the surface of the pouch to make contact with an inner surface of the pouch and a surface of the portable electronic device making contact with that inner surface to further clean the surface of the portable electronic device.

Similarly, when removing the portable electronic device from the sleeve, the elastic opening of the cuff is expanded and the portable electronic device is pulled through the expanded opening while the inner surface of the cuff makes contact with a surface of the portable electronic device to clean the surface of the portable electronic device throughout the remove process. Once the portable electronic device has been pulled completely through the opening of the cuff, the opening reverts to its un-expanded configuration. Because the disclosed sleeve allows the screen of a portable electronic device to be cleaned each time when the device is being inserted into or removed from the sleeve, the disclosed sleeve facilitates simplifying the device screen cleaning operation, increasing the cleaning frequencies, maintaining cleaning efficacy, and as a result, minimizing or eliminating damages to the screen and protecting the device from moisture both when the device is stored inside the protective cleaning sleeve and being used outside the protective cleaning sleeve.

In some embodiments, the disclosed protective cleaning sleeve can be turned inside out and used like a glove or mitt where a user can place a hand inside the turned sleeve, so that an inner surface having cleaning properties of the sleeve can be applied to the screen of the portable electronic device to either wipe-clean the entire screen surface or spot-clean sections of the screen.

Figure 4:
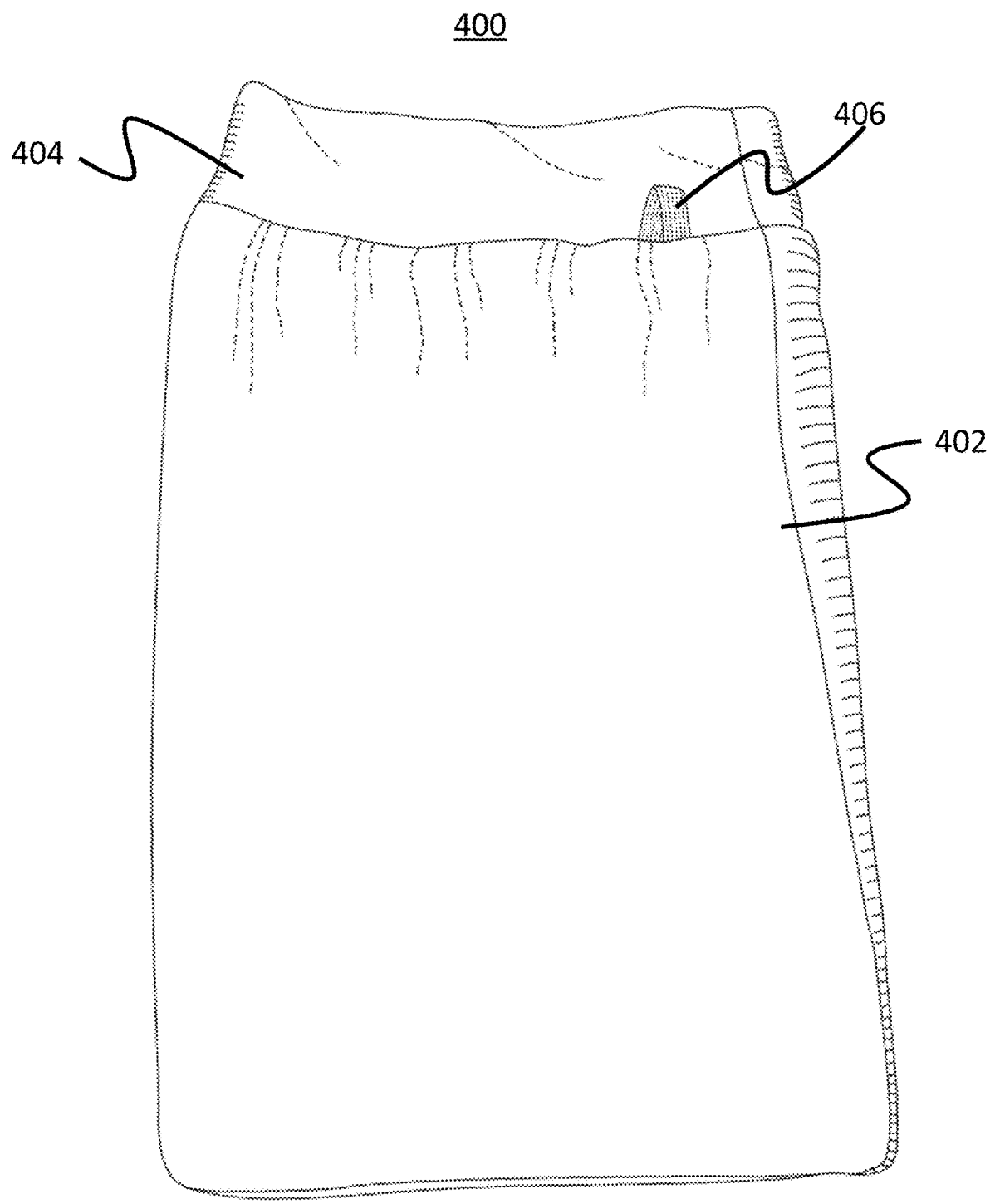
FIG. 4 illustrates an exemplary protective cleaning sleeve equipped with an accessory carrying mechanism in accordance with some embodiments described herein.

FIG. 4 illustrates an exemplary protective cleaning sleeve 400 equipped with an accessory carrying mechanism in accordance with some embodiments described herein. As can be seen in FIG. 4, sleeve 400 is provided with an accessory carrying mechanism in the form of an elastic loop 406 that is attached at both ends with some portion of sleeve 400. In some embodiments, the size of elastic loop 406 is configured to hold a charging cable or other accessories, such as a pen or stylus that a user often needs when carrying a portable electronic device inside sleeve 400. Although elastic loop 406 is shown to be located at a location where cuff 404 and pouch 402 are joined together, elastic loop 406 may be located above or below the exemplary location shown in FIG. 4.

Figure 5:
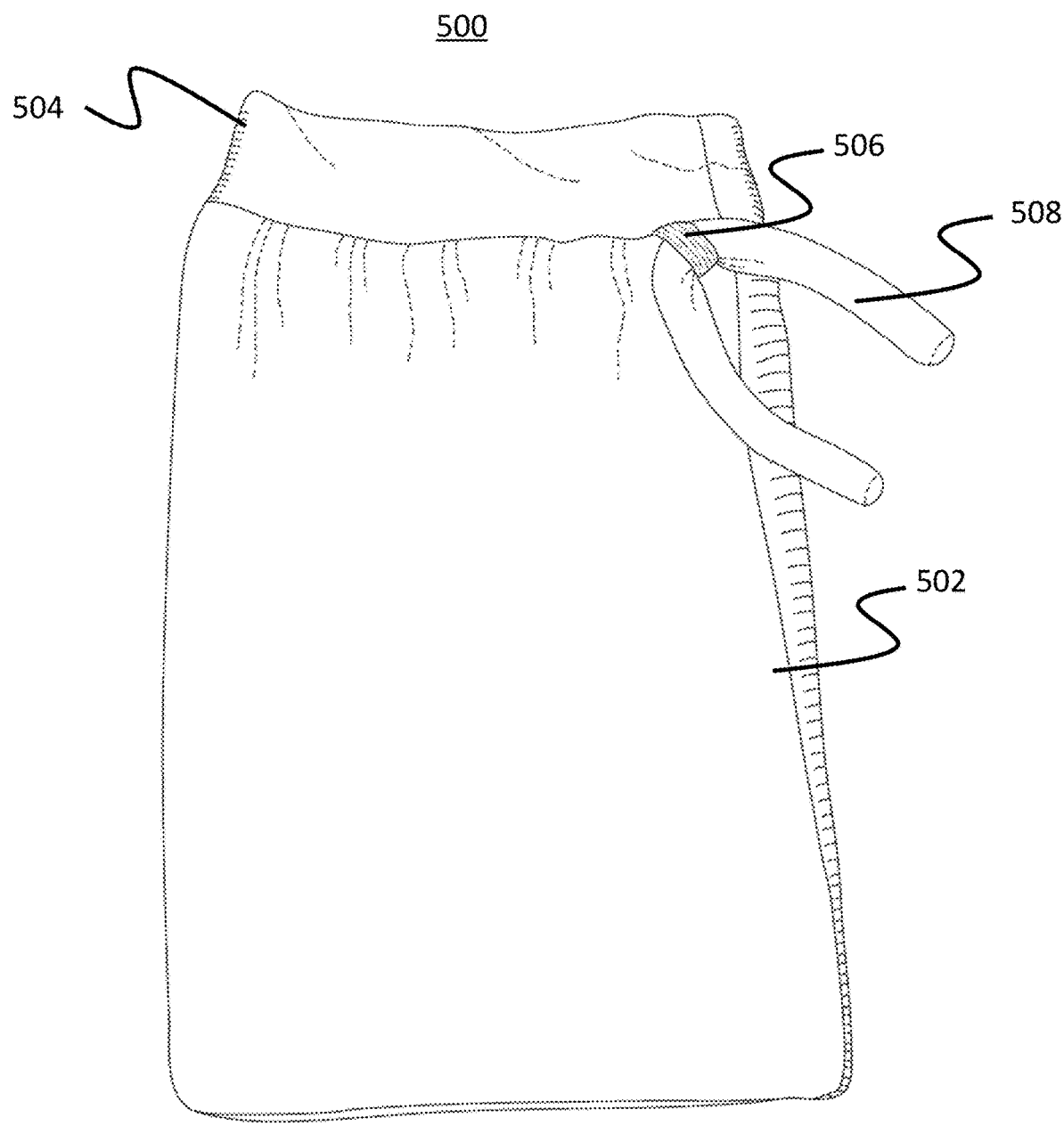
FIG. 5 illustrates an exemplary protective cleaning sleeve equipped with a tie-on loop attached to an elastic loop for carrying a larger accessory in accordance with some embodiments described herein.

FIG. 5 illustrates an exemplary protective cleaning sleeve 500 equipped with a tie-on loop attached to an elastic loop for carrying a larger accessory in accordance with some embodiments described herein. As can be seen in FIG. 5, protective cleaning sleeve 500 includes a pouch 502, a cuff 504 as described above, and an elastic loop 506 similar to elastic loop 406 shown in FIG. 4 for attaching an accessory of an portable electronic device. Compared to protective cleaning sleeve 400, a tie-on loop 508 is added in protective cleaning sleeve 500 which is attached to elastic loop 506. In some embodiments, tie-on loop 508 is made of a bendable stick that can be used to secure an accessory such as an electrical cord and plug by twisting around the accessory. In some embodiments, tie-on loop 508 can have a securing mechanism such as a magnetic clasp, snap, Velcro® to secure an accessory with sleeve 500.

Figure 6:
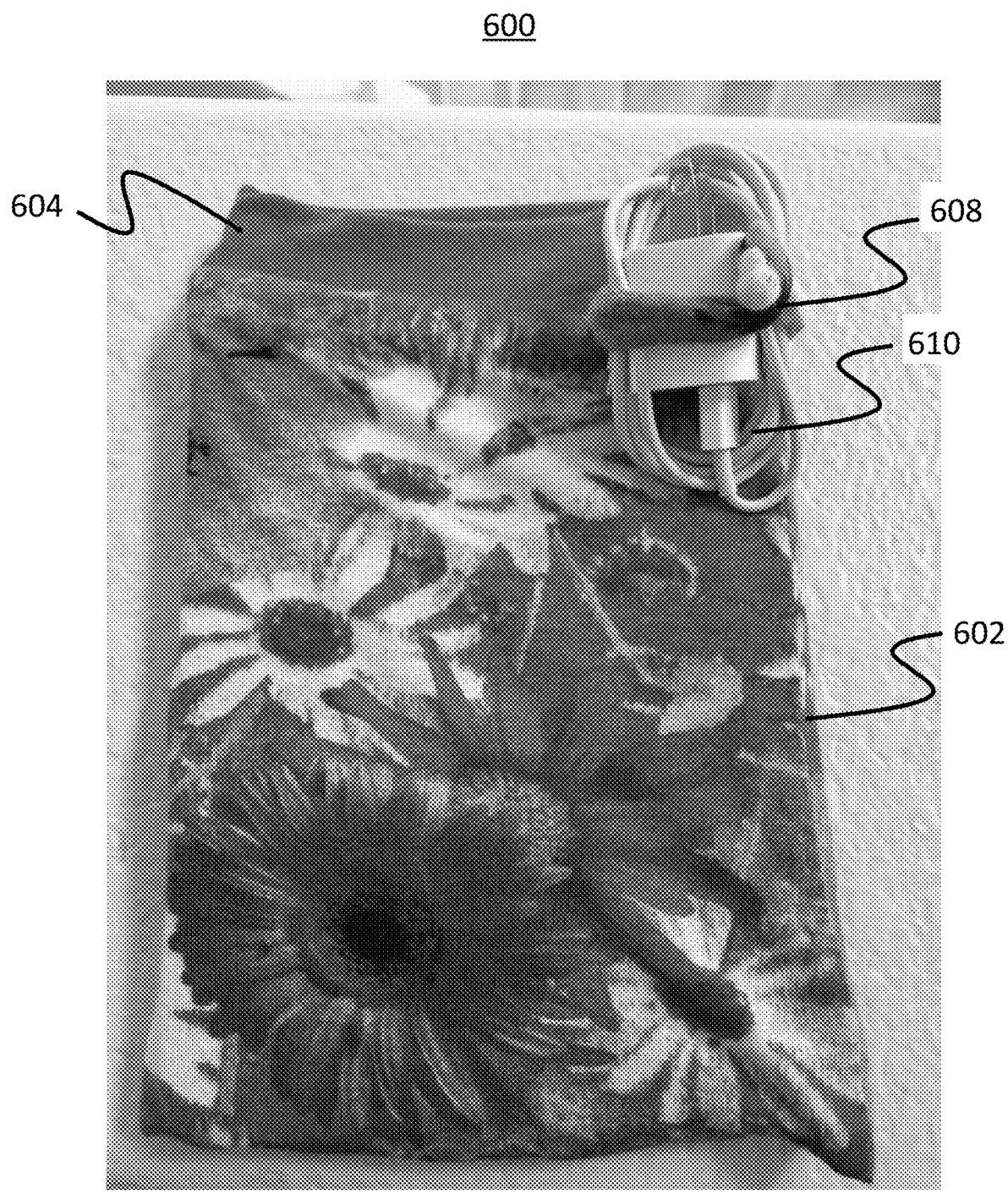
FIG. 6 presents a photographic image of a manufactured protective cleaning sleeve based on the design of protective cleaning sleeve in FIG. 5 in accordance with some embodiments described herein.

FIG. 6 presents a photographic image of a manufactured protective cleaning sleeve 600 based on the design of protective cleaning sleeve 500 in FIG. 5 in accordance with some embodiments described herein. As can be seen in FIG. 6, protective cleaning sleeve 600 includes a pouch 602, a cuff 604 as described above, and a tie-on loop 608 that is attached to sleeve 600 for attaching an accessory of a portable electronic device. As shown in FIG. 6, tie-on loop 608 is used to attach and retain a charging cable and power brick 610 of a portable electronic device.

Figure 7:
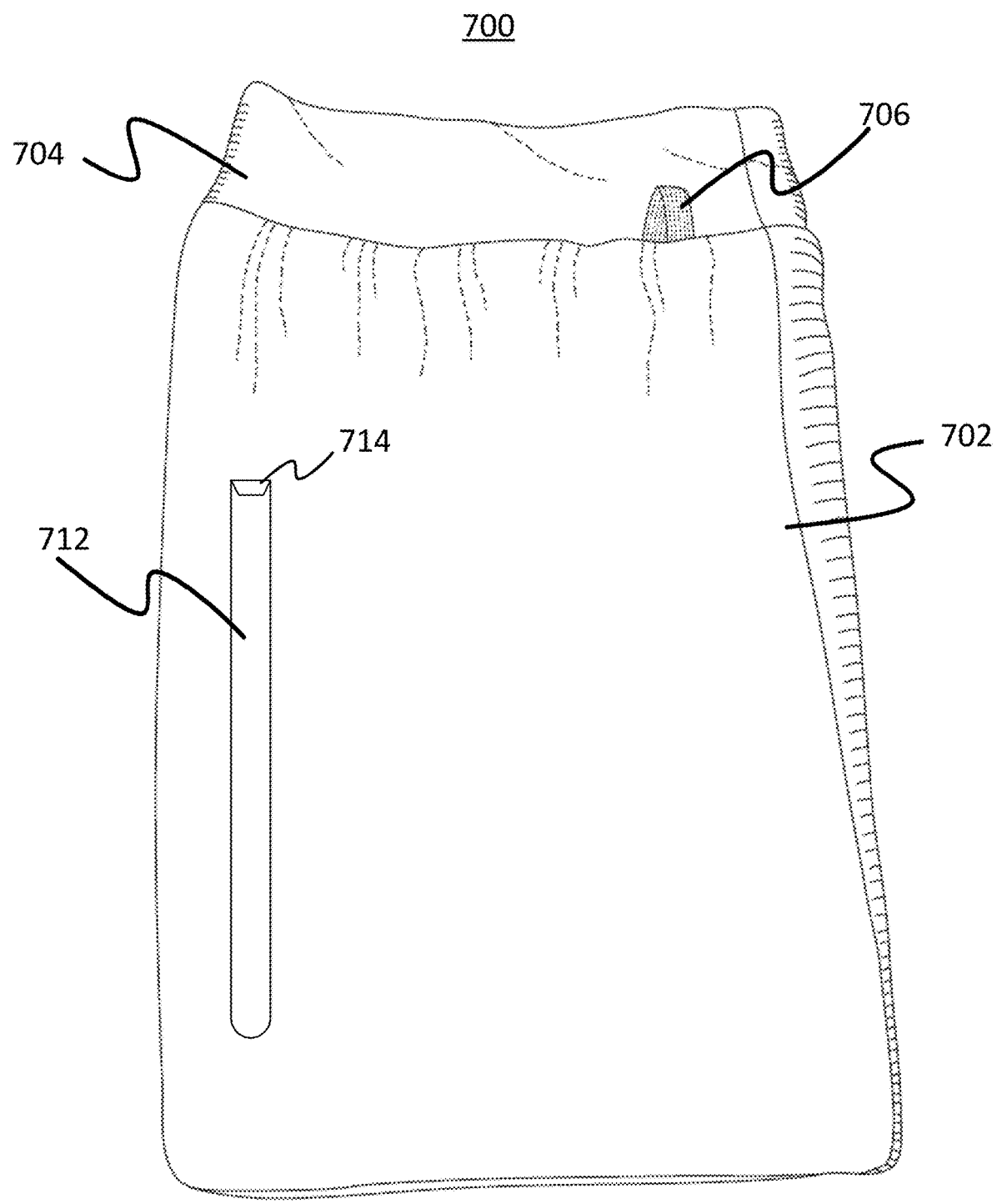
FIG. 7 illustrates an exemplary protective cleaning sleeve equipped with both an elastic loop and an external pocket in accordance with some embodiments described herein.

FIG. 7 illustrates an exemplary protective cleaning sleeve 700 equipped with both an elastic loop 706 and an external pocket 712 in accordance with some embodiments described herein. As can be seen in FIG. 7, protective cleaning sleeve 700 includes a pouch 702, a cuff 704 as described above, and an elastic loop 706 similar to elastic loop 406 shown in FIG. 4 for attaching an accessory of an portable electronic device. Additionally, protective cleaning sleeve 700 includes a slim profile external pocket 712, the size and shape of that can be determined based on the pen or stylus used by the portable electronic device. In the embodiment shown, external pocket 712 also includes a flap 714 that can be closed over the opening of external pocket 712 to securely enclose a pen or stylus once the pen or stylus has been placed inside external pocket 712. Although external pocket 712 is shown to be located on the same side of sleeve 700 as elastic loop 702, external pocket 712 can also be located on the opposite side (e.g., the back side) of sleeve 700. In some embodiments, external pocket 712 can be located on either the left or the right edge of pouch 702. In further embodiments, instead of using an external pocket, an internal pocket inside sleeve 700 can be used in place of external pocket 712 as a pocket for a pen or stylus.

While external pocket 712 is configured with a size and shape suitable for a pen or stylus, other embodiments of the disclosed protective cleaning sleeve can be equipped with an external pocket having other sizes and shapes for carrying other accessories or personal effects. For example, an exemplary external pocket on a protective cleaning sleeve can be configured with a size and shape suitable for enclosing a pair of glasses.

Figure 8A:
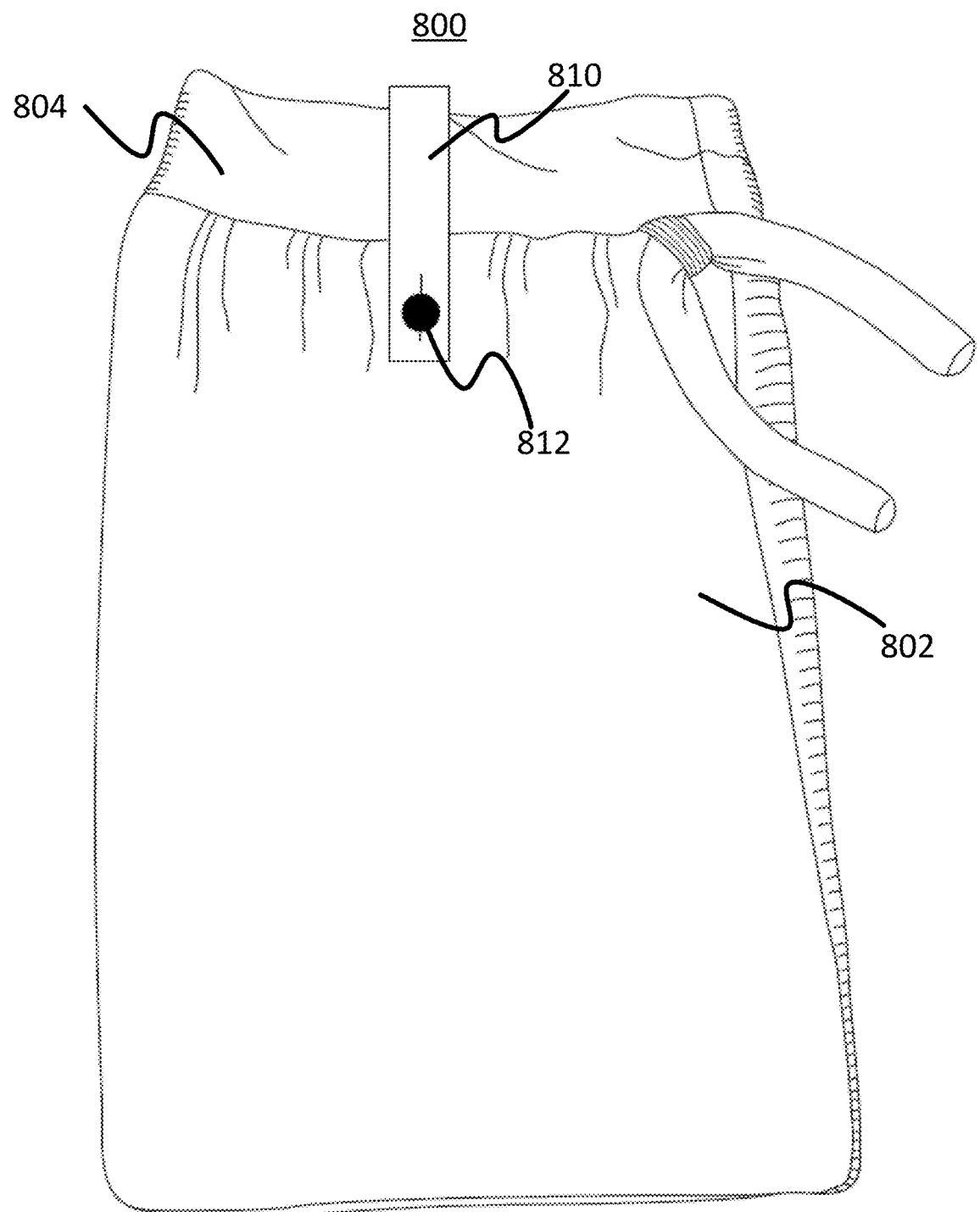
FIG. 8A illustrates an exemplary protective cleaning sleeve equipped with a closing mechanism for closing the opening of the protective cleaning sleeve in accordance with some embodiments described herein.

FIG. 8A illustrates an exemplary protective cleaning sleeve 800 equipped with a closing mechanism for closing the opening of the protective cleaning sleeve in accordance with some embodiments described herein. As shown in FIG. 8, the closing mechanism includes a piece 810 that is folded over the opening of cuff 804 and a piece 812 that fastens piece 810 onto pouch 802. In some embodiments, piece 810 can be made of fabric, cording, or ribbon or other similar material. In some embodiments, piece 812 is one of a button, a snap, a magnetic closure or other similar item for fastening piece 810 on the surface of pouch 802. Note that the disclosed closing mechanism allows a portable electronic device to be more securely enclosed inside protective cleaning sleeve 800.

Figure 8B:
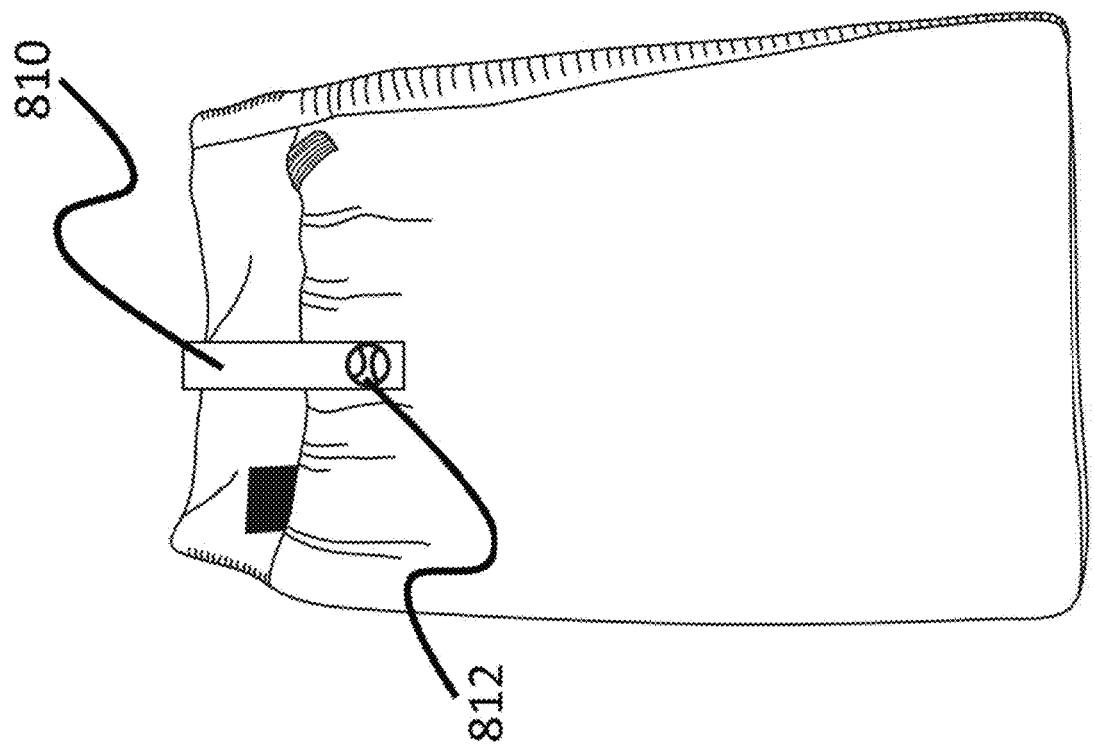
FIG. 8B presents a photographic image showing a manufactured protective cleaning sleeve having a closing mechanism based on the design of the protective cleaning sleeve in FIG. 8A in accordance with some embodiments described herein.
Figure 8C:
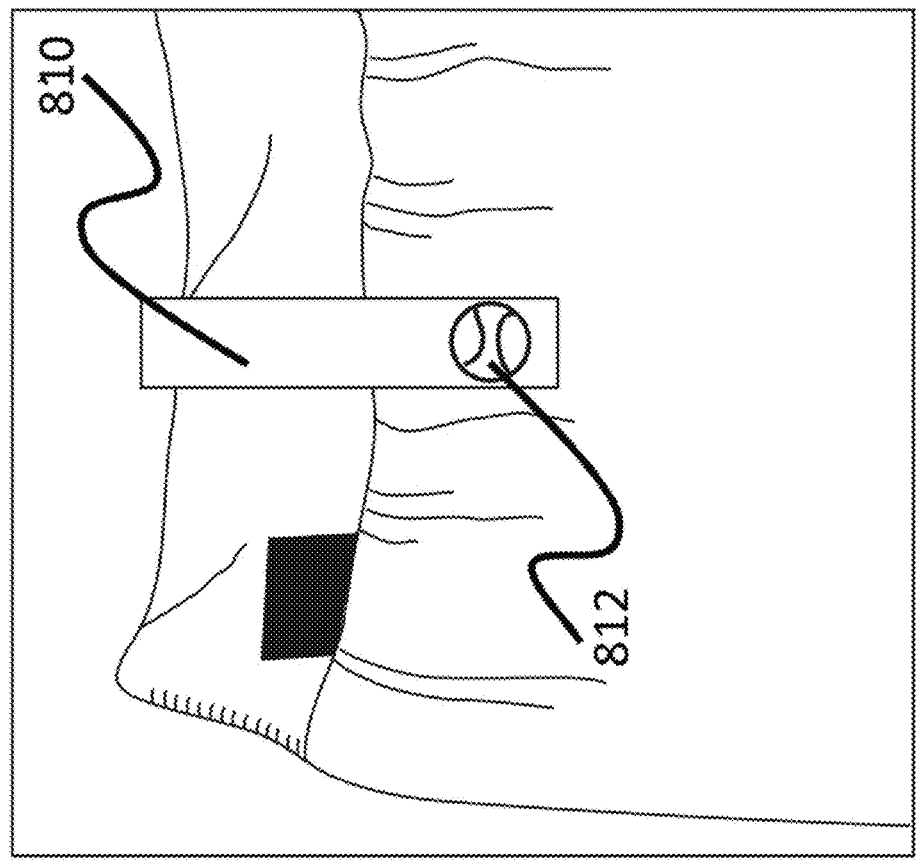
FIG. 8C presents a zoomed-in photographic image of the closing mechanism of the manufactured protective cleaning sleeve in FIG. 8B.

FIG. 8B presents a photographic image showing a manufactured protective cleaning sleeve having a closing mechanism based on the design of protective cleaning sleeve 800 in FIG. 8A in accordance with some embodiments described herein. In the embodiment shown, piece 810 is made of a fabric similar to the cuff while piece 812 is a snap. FIG. 8C presents a zoomed-in photographic image showing more details of the closing mechanism of the manufactured protective cleaning sleeve in FIG. 8B.

Figure 9A:
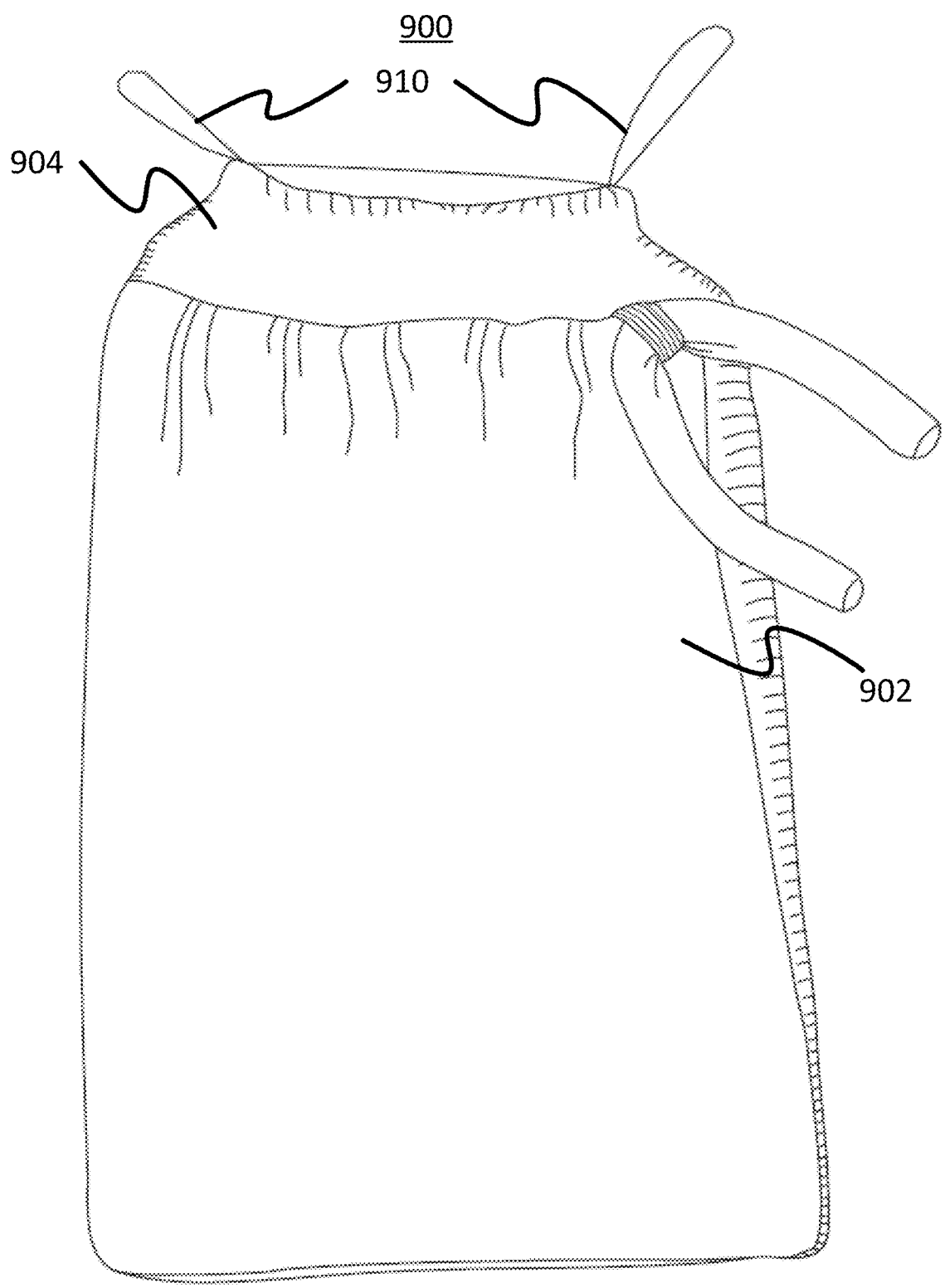
FIG. 9A illustrates an exemplary protective cleaning sleeve equipped with another closing mechanism for closing the opening of the protective cleaning sleeve in accordance with some embodiments described herein.

FIG. 9A illustrates an exemplary protective cleaning sleeve 900 equipped with another closing mechanism for closing the opening of the protective cleaning sleeve in accordance with some embodiments described herein. As shown in FIG. 9A, a closing mechanism 910 in form of a drawstring is placed in the seam at the opening of cuff 904, and is configured to close the opening when the drawstring is pulled. While the embodiment of sleeve 900 uses a drawstring to tighten or close the opening of sleeve 900, other embodiments of closing mechanism 910 can include a snap, a button, a Velcro or other mechanisms which can be placed at the opening of cuff 904 to tighten or close the opening.

Figure 9B:
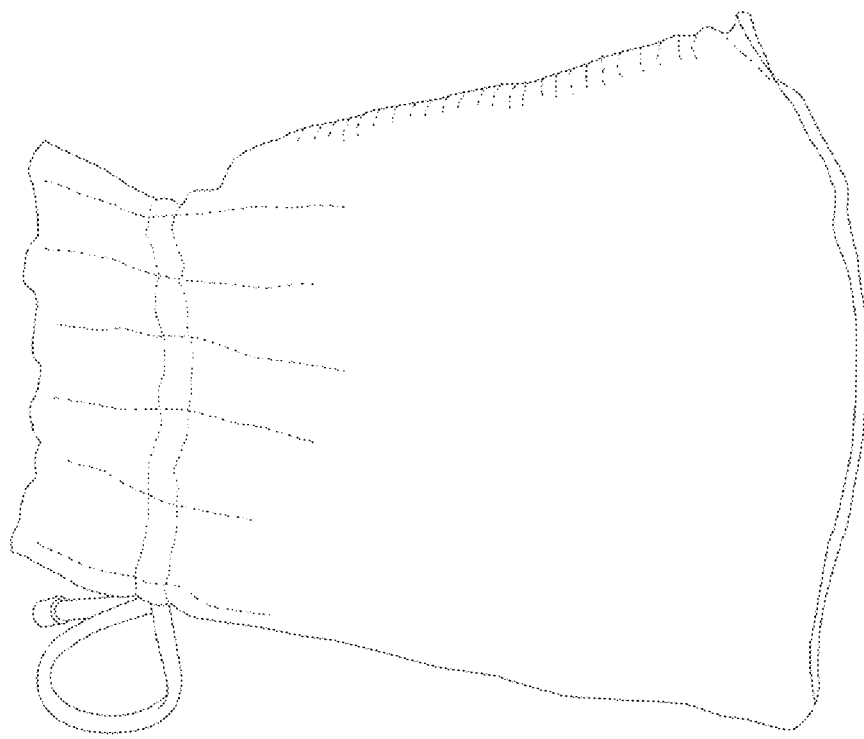
FIG. 9B presents a photographic image showing a manufactured protective cleaning sleeve having a drawstring placed around a neck of the sleeve where the pouch and the cuff are joined in accordance with some embodiments described herein.
Figure 9C:
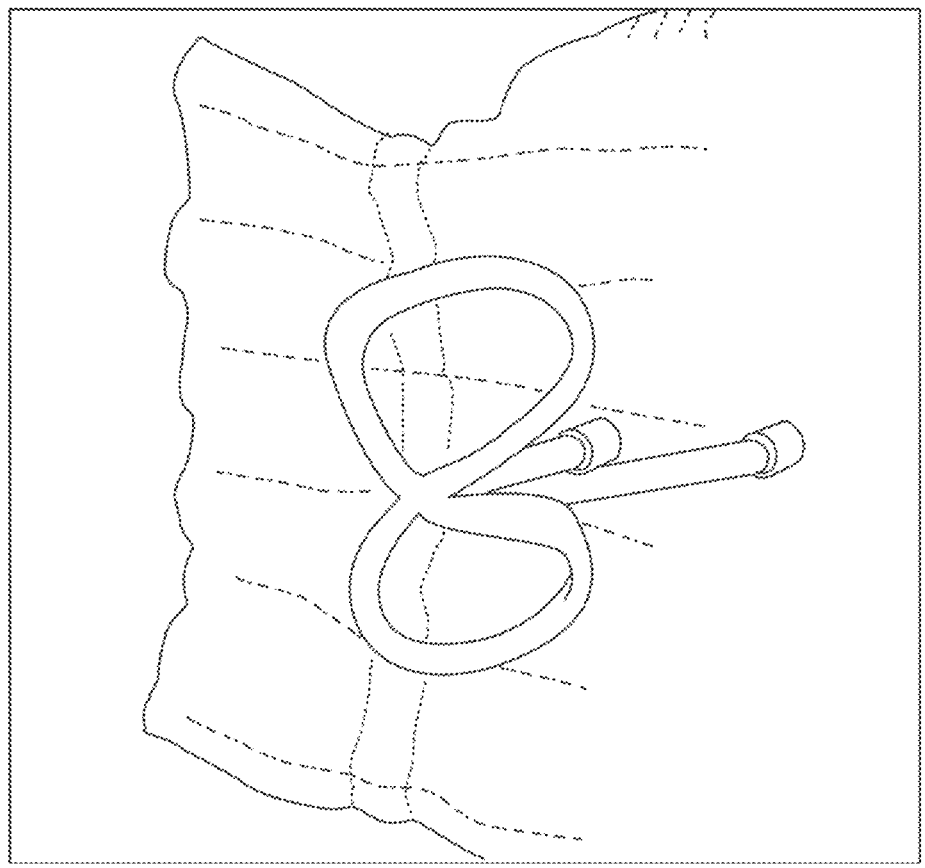
FIG. 9C presents a zoomed-in photographic image showing more details of the closing mechanism of the manufactured protective cleaning sleeve in FIG. 9B.

While the embodiment of sleeve 900 uses a drawstring around the seam at the opening of cuff 904, other embodiments of closing mechanism 910 can use a drawstring placed around the opening of pouch 902 where cuff 904 and pouch 902 are joined. FIG. 9B presents a photographic image showing a manufactured protective cleaning sleeve having a drawstring placed around a neck of the sleeve where the pouch and the cuff are joined in accordance with some embodiments described herein. FIG. 9C presents a zoomed-in photographic image showing more details of the closing mechanism of the manufactured protective cleaning sleeve in FIG. 9B.

Figure 10:
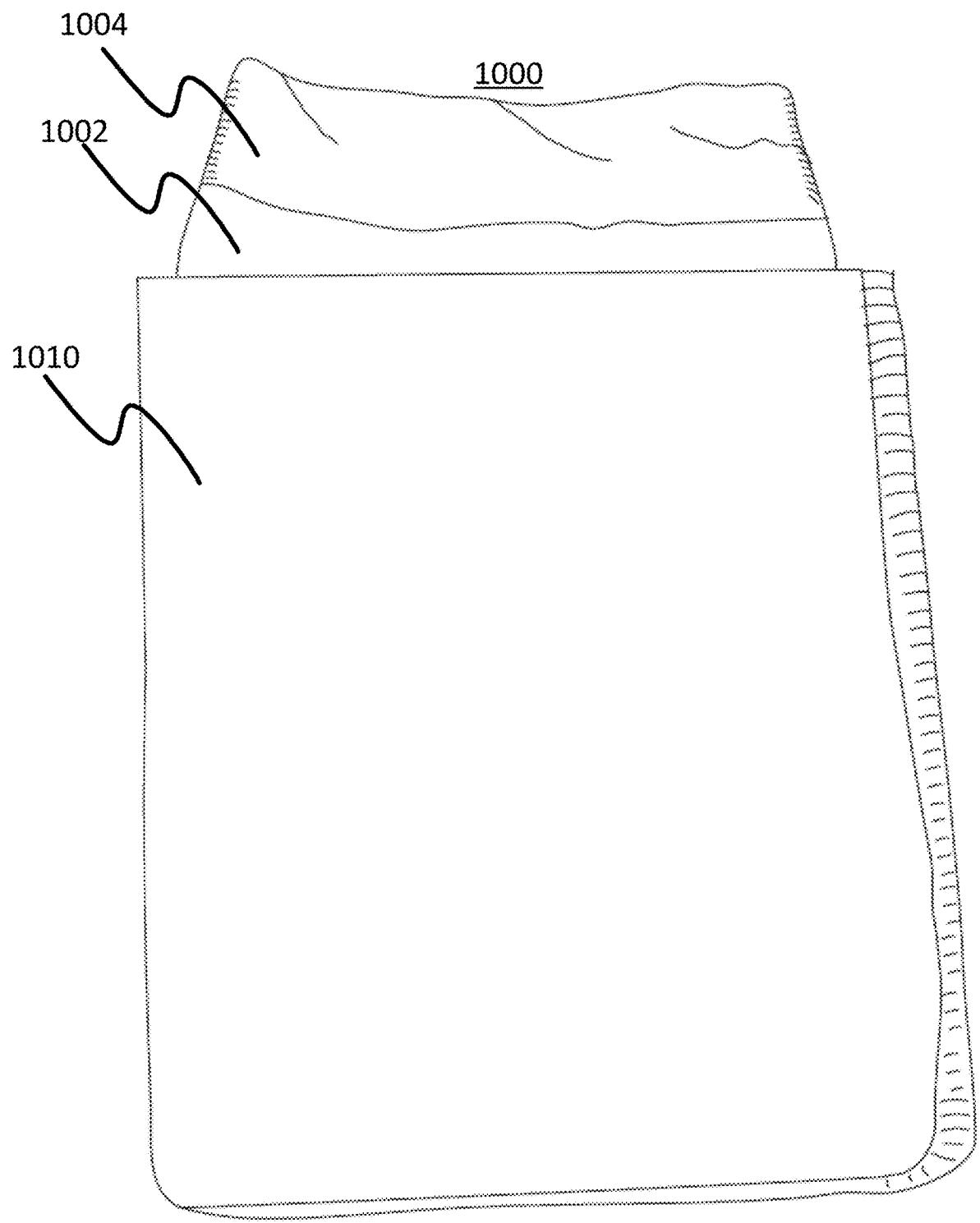
FIG. 10 illustrates an exemplary protective cleaning sleeve being integrated with an outer case in accordance with some embodiments described herein.

Note that the disclosed protective cleaning sleeve can also be integrated with a larger carrying case for the convenience of carrying. For example, FIG. 10 illustrates an exemplary protective cleaning sleeve 1000 being integrated with an outer case 1010 in accordance with some embodiments described herein. In the embodiment shown, pouch 1002 of sleeve 1000 is substantially inside outer case 1010 so that a portable electronic device inside pouch 1002 receives additional protection from outer case 1010; however, cuff 1004 of sleeve 1000 is substantially outside outer case 1010 to allow a portable electronic device to be easily inserted into or removed from pouch 1002.

Figure 11A:
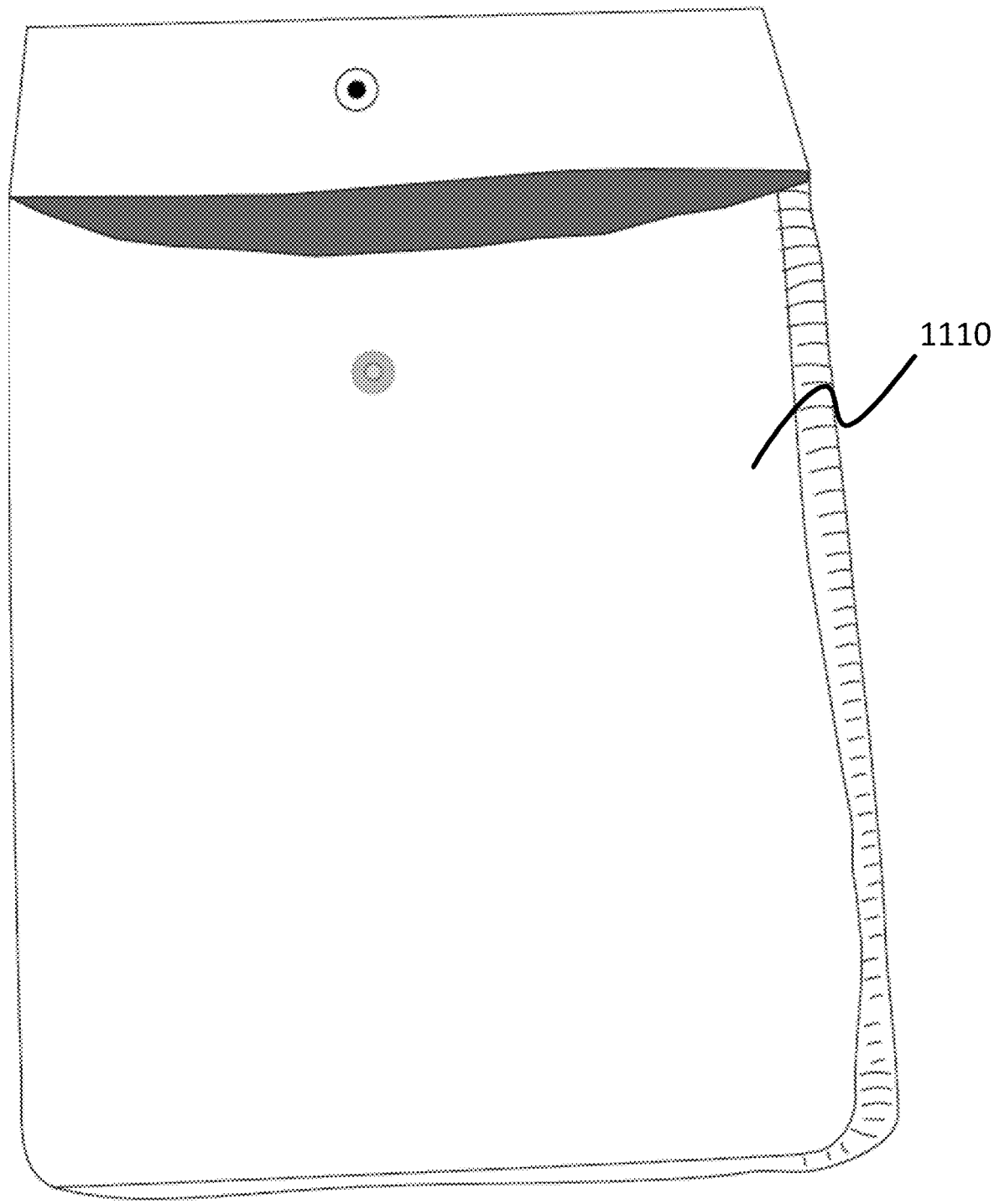
FIG. 11A illustrates an exemplary protective cleaning sleeve (not visible) being integrated into a carrying/travel case in accordance with some embodiments described herein.
Figure 11B:
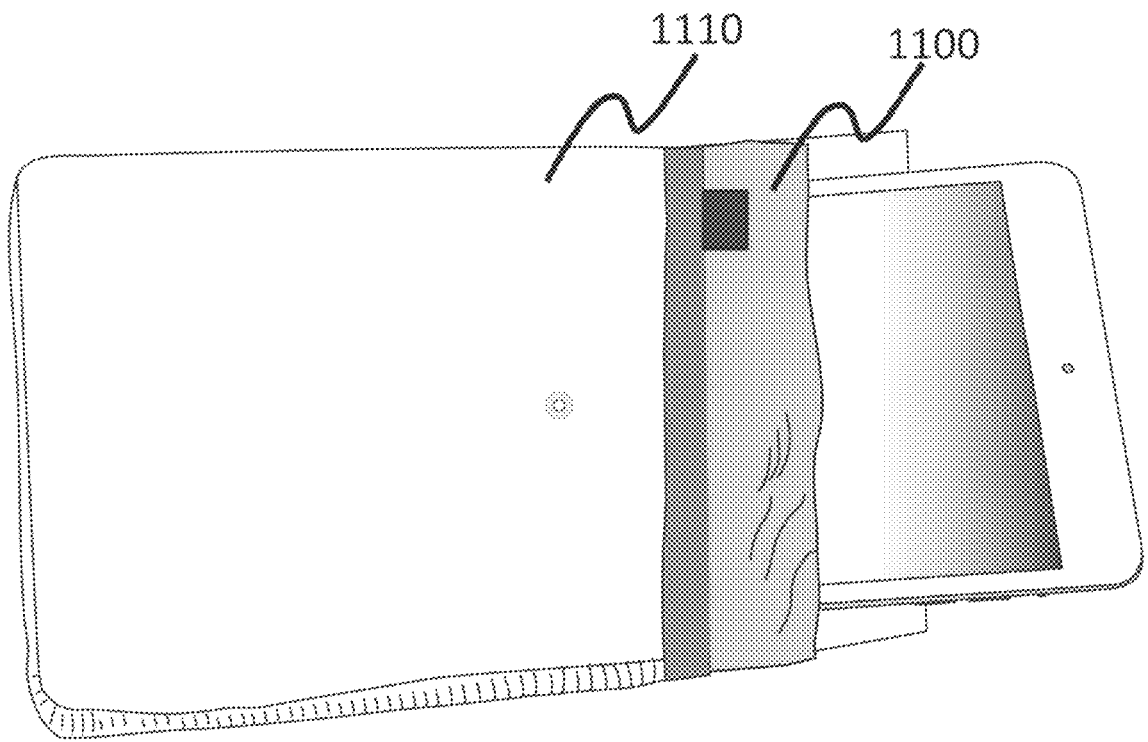
FIG. 11B presents a photographic image showing a manufactured carrying/travel case integrated with a protective cleaning sleeve based on the design illustrated in FIG. 11A in accordance with some embodiments described herein.
Figure 11C:
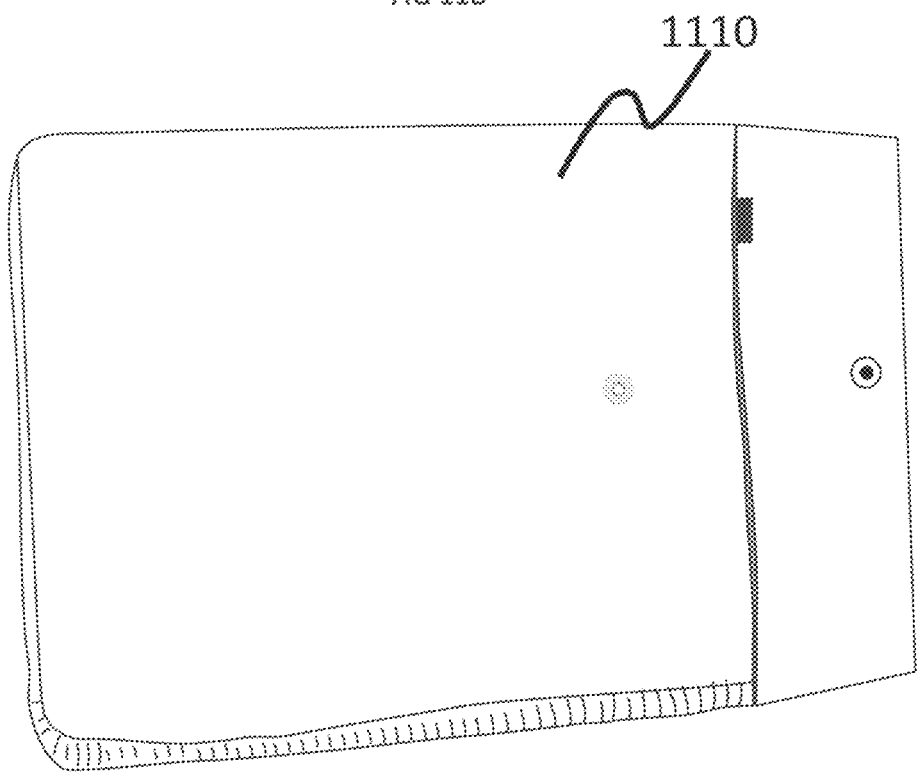
FIG. 11C presents a photographic image showing the carrying/travel case in FIG. 11B when the integrated protective cleaning sleeve is entirely inside the carrying/travel case.

In contrast, FIG. 11A illustrates an exemplary protective cleaning sleeve (not visible) being integrated into a carrying/travel case 1110 in accordance with some embodiments described herein. In this embodiment, the entire sleeve is placed inside carrying/travel case 1110 for the maximum protection. FIG. 11B presents a photographic image showing a manufactured carrying/travel case 1110 integrated with a protective cleaning sleeve 1100 based on the design illustrated in FIG. 11A in accordance with some embodiments described herein. In the embodiment shown, protective cleaning sleeve 1100 is partially pulled out of carrying/travel case 1110 for illustration purposes. FIG. 11C presents a photographic image showing carrying/travel case 1110 when the integrated protective cleaning sleeve 1100 is entirely inside carrying/travel case 1110.

Figure 12A:
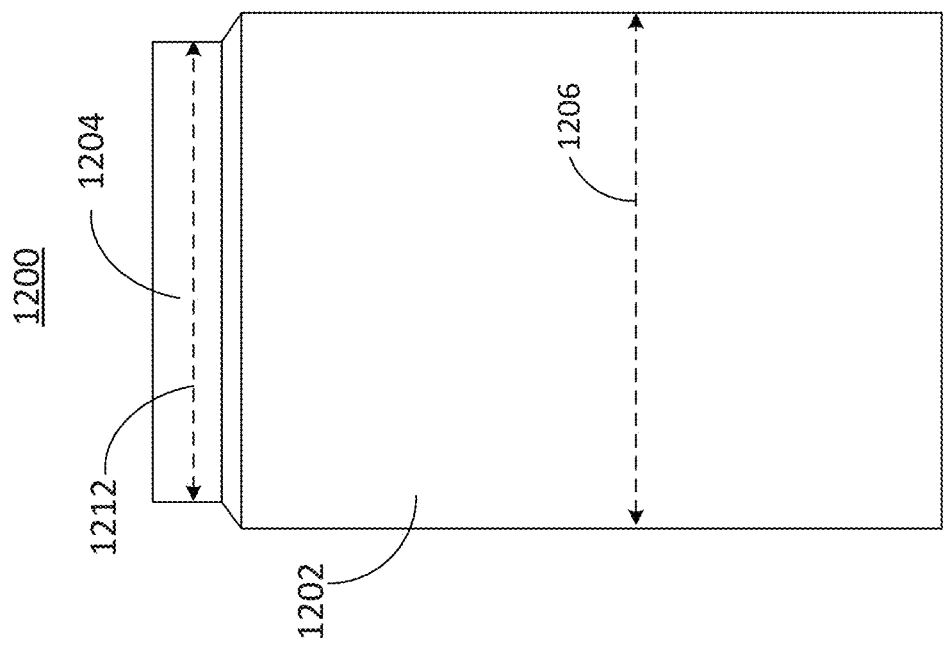
FIG. 12A illustrates an exemplary protective cleaning sleeve having a substantially uniform width in the cuff in accordance with some embodiments described herein.
Figure 12B:
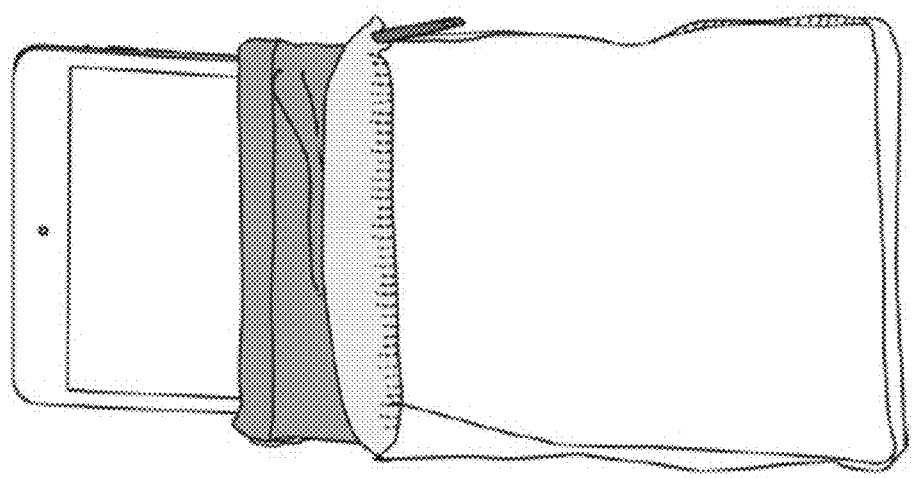
FIG. 12B presents a photographic image showing a manufactured protective cleaning sleeve having a cuff profile based on the design of the protective cleaning sleeve in FIG. 12A in accordance with some embodiments described herein.

FIG. 12A illustrates an exemplary protective cleaning sleeve 1200 having a substantially uniform width in the cuff in accordance with some embodiments described herein. First referring back to the exemplary protective cleaning sleeve 100 illustrated and described in FIGS. 1 and 2, note that cuff 104 has a tapered side profile such that the width of cuff 104 is greater near pouch 102 and gradually tapers off and ends at a reduced width 112 at the opening 110 of cuff 104. In contrast, in the exemplary protective cleaning sleeve 1200, cuff 1204 is configured with a substantially uniform width 1212 throughout its height direction. Note that this design is enabled by the profile of pouch 102 near its opening which rapidly shrinks from the regular width 1206 of pouch 1202 to the width 1212 of cuff 1204. FIG. 12B presents a photographic image showing a manufactured protective cleaning sleeve having a cuff profile based on the design of protective cleaning sleeve 1200 in FIG. 12A in accordance with some embodiments described herein.

Figure 13A:
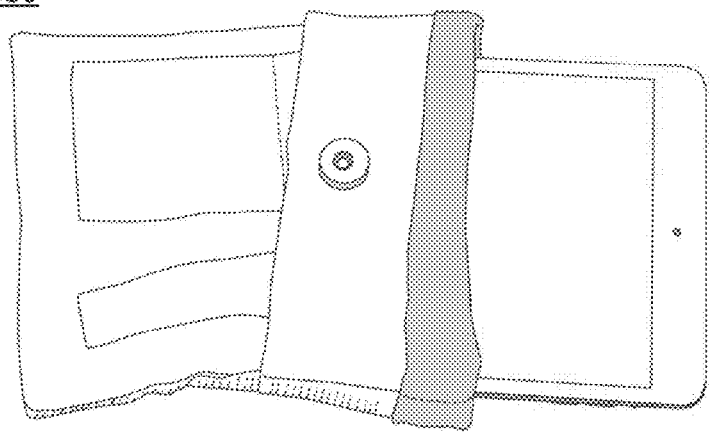
FIG. 13A presents a photographic image showing an exemplary protective cleaning sleeve in accordance with some embodiments described herein.

FIG. 13A presents a photographic image showing an exemplary protective cleaning sleeve 1300 in accordance with some embodiments described herein. As shown in FIG. 13A, protective cleaning sleeve 1300 is partially folded over to expose an interior which is made of a cleaning material. Note that protective cleaning sleeve 1300 is essentially a pouch without a cuff, and the pouch has a snap closure mechanism. Moreover, the pouch is made sufficiently flexible so that it can be turned inside out to clean the screen.

Figure 13B:
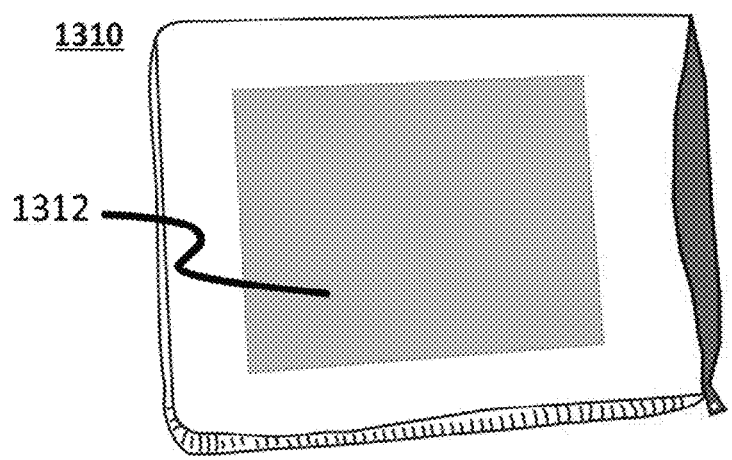
FIG. 13B presents a photographic image showing another exemplary protective cleaning sleeve in accordance with some embodiments described herein.
Figure 13C:
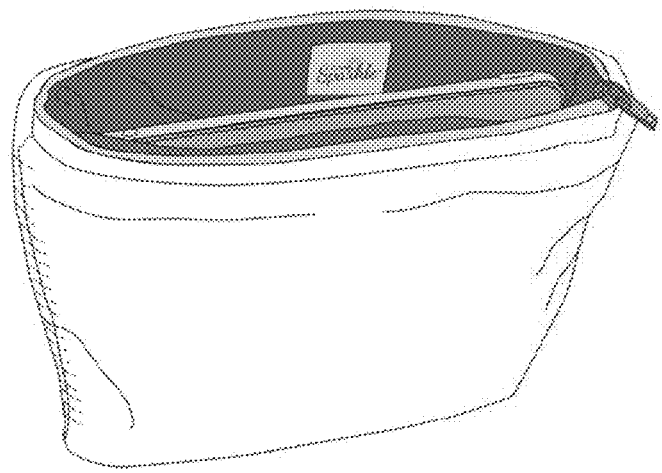
FIG. 13C shows a zoomed-in view of the opening of the protective cleaning sleeve in FIG. 13B in accordance with some embodiments described herein.

FIG. 13B presents a photographic image showing an exemplary protective cleaning sleeve 1310 in accordance with some embodiments described herein. Protective cleaning sleeve 1310 is similar to protective cleaning sleeve 1300 in that it has a pouch without a cuff. However, protective cleaning sleeve 1310 uses a zipper as the closure mechanism instead of a snap like in protective cleaning sleeve 1300. Protective cleaning sleeve 1310 also includes an embellishment 1312 on the cover. Embellishment 1312 can be attached with sleeve interior or on a sleeve with half microfiber inside for stability. FIG. 13C shows a zoomed-in view of the opening of protective cleaning sleeve 1310 in accordance with some embodiments described herein.

Figure 14A:
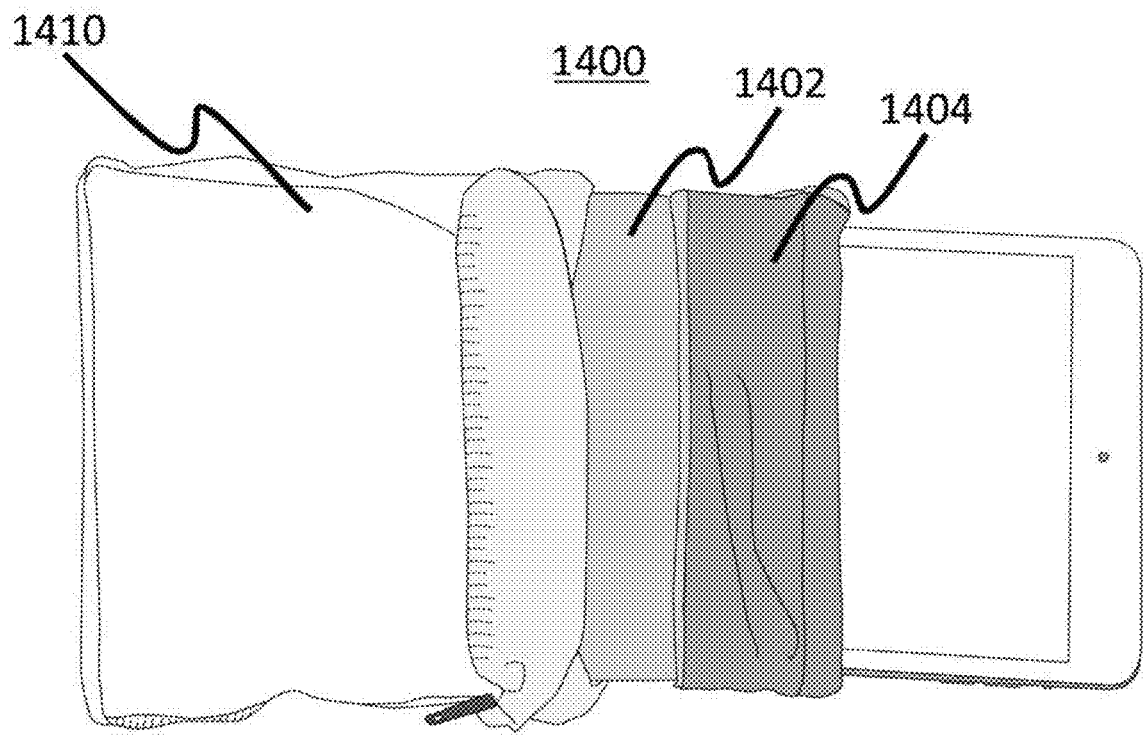
FIG. 14A presents a photographic image showing an exemplary protective cleaning sleeve fitted into a cover in accordance with some embodiments described herein.
Figure 14B:
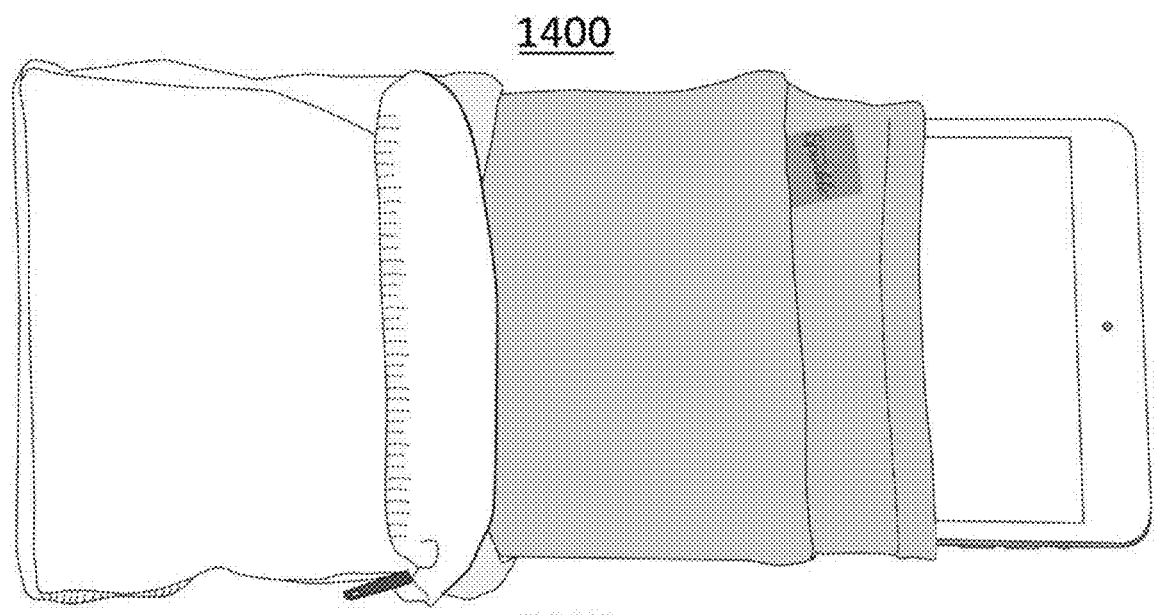
FIG. 14B presents a photographic image showing the sleeve in FIG. 14A with an unfolded cuff in accordance with some embodiments described herein.

FIG. 14A presents a photographic image showing an exemplary protective cleaning sleeve 1400 fitted into a cover 1410 in accordance with some embodiments described herein. More specifically, FIG. 14A shows protective cleaning sleeve 1400 having been partially pulled out from cover 1410 and cuff 1404 of sleeve 1400 folded down and over pouch 1402. In the particular embodiment, microfiber is used on half of cuff 1404 and pouch 1402. For other portions of sleeve 1400 inside and outside, bamboo is used which can also be used to clean the screen of a portable electronic device. In some embodiments, sleeve 1400 is made without a cover and the entire sleeve inside and out can be used for cleaning. FIG. 14B presents a photographic image showing protective cleaning sleeve 1400 with an unfolded cuff 1404 in accordance with some embodiments described herein.

Figure 15A:
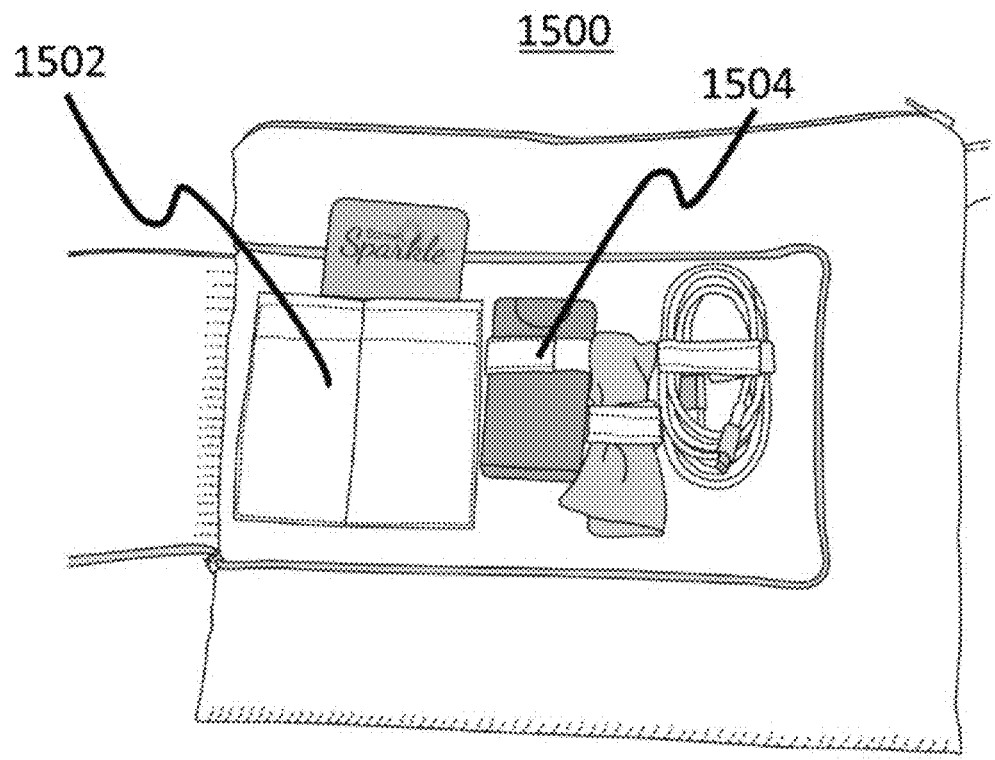
FIG. 15A presents a photographic image showing an exemplary carrying case with a protective cleaning sleeve inside in accordance with some embodiments described herein.

FIG. 15A presents a photographic image showing an exemplary carrying case 1500 with a protective cleaning sleeve inside (not invisible) in accordance with some embodiments described herein. As shown in FIG. 15, carrying case 1500 includes a zipper pocket 1502 which is configured to contain accessories such as cleaning solution, business cards, cording, stylus, pen, etc. In the embodiment show, the accessories are held inside zipper pocket 1502 by individual Velcro loops, such as Velcro loop 1504. In other embodiments, accessory attachments inside zipper pocket 1502 are elastic loops instead of Velcro loops. In further embodiments, accessory attachments inside zipper pocket 1502 can include both Velcro loops and elastic loops. Although not shown in FIG. 15A, one or more Velcro loops for accessory attachment can also be outside zipper pocket 1502 and fitted directly on the surface of carrying case 1500. In the particular embodiment, carrying case 1500 and zipper pocket 1502 are made with laminated fabric.

Figure 15B:
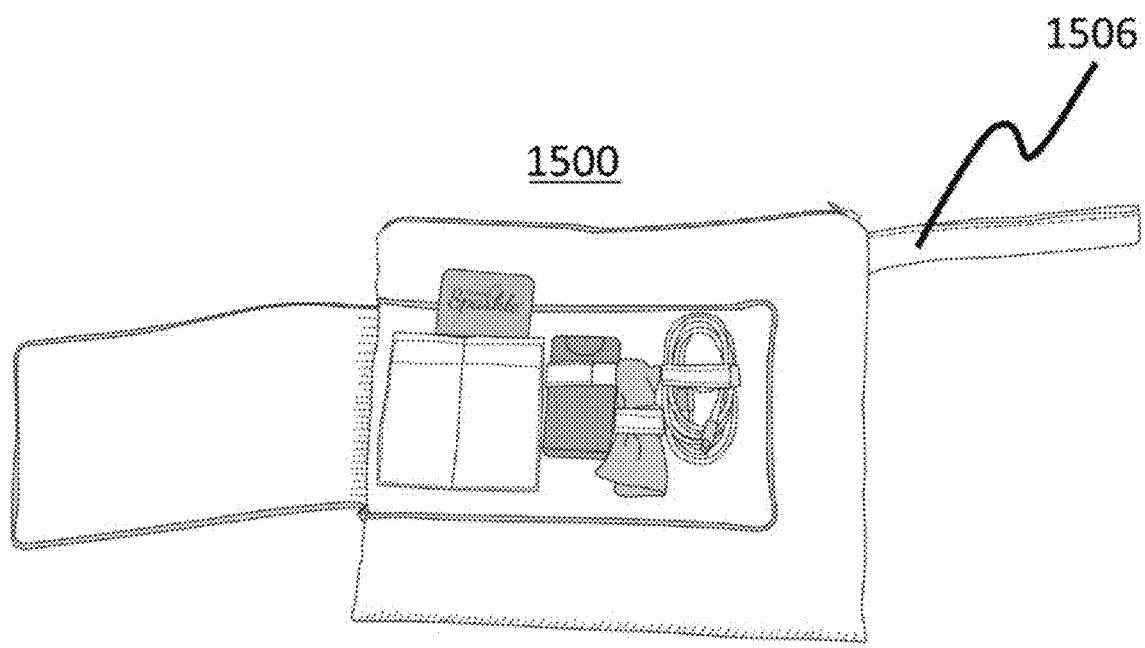
FIG. 15B shows a zoomed-out view of the carrying case in FIG. 15A in accordance with some embodiments described herein.

FIG. 15B shows a zoomed-out view of carrying case 1500 in accordance with some embodiments described herein. As can be seen, carrying case 1500 additionally includes a wristlet handle 1506 as an add-on. Although not visible, the protective cleaning sleeve inside carrying case 1500 can also include a wristlet handle as an add-on.

While the above discussion assumes the use of the disclosed protective cleaning sleeve as to enclose a portable electronic device, the disclosed protective cleaning sleeve can be used to enclose a portable electronic device inside a separate protective case to keep the case clean without departing from the scope of the descriptions herein. For example, the disclosed protective cleaning can enclose an Apple iPad™ inside an Apple Smart Cover™ to keep the case clean. Other protective cases that can be used on an portable electronic device such as a tablet and is subsequently enclosed by the disclosed protective cleaning sleeve include: Incase's Keyboard case, book jacket, Origami jacket, Mag snap case, Otterbox protective case, Leather cases, Magnetic cases, Folio's Turn folio flip cover, Padded case, Flip stand, and Kickstand case, among others. In these embodiments, the disclosed protective cleaning sleeve can also be used to clean the protective case and the portable electronic device inside the protective case when the protective cleaning sleeve is turned inside out and used as a cleaning glove as discussed above.

In other embodiments, the disclosed protective cleaning sleeve can also be used to carry accessories such as a keyboard or tablet stand of a tablet provided that such accessories are of substantially the same size as the tablet. For example, a protective cleaning sleeve can fit over a tablet with a keyboard or a stand attached to the tablet to keep both the tablet and the accessory clean. The internal cleaning function of the protective cleaning sleeve may not be necessary in this example because the tablet screen is typically covered by the case or the keyboard. However, once the tablet is taken out of the case, the protective cleaning sleeve can be used to clean the screen of the tablet.

The above description of the disclosed embodiments is provided to enable any person skilled in the art to make or use the invention as claimed. Various modifications to these embodiments will be readily apparent to those skilled in the art, and the generic principles described herein can be applied to other embodiments without departing from the spirit or scope of the descriptions herein. Thus, it is to be understood that the description and drawings presented herein represent example embodiments and are therefore merely representative. It is further understood that the scope of the claims fully encompasses other embodiments that may become clear to those skilled in the art and that the scope of the claims is accordingly not limited by the specified embodiments disclosed herein.

The invention claimed is:

1. A protective cleaning sleeve for a portable electronic device, comprising:
    a protective pouch having a first width that is approximately equal to a width of the portable electronic device; and
    a stretchable cuff attached to an open end of the protective pouch at a first end of the stretchable cuff, the stretchable cuff comprising:
        an elastic opening at a second end of the stretchable cuff, the elastic opening having a second width, smaller than the first width, that is based on the first width of the protective pouch and a ratio of the first width to the second width that is between 1.1 and 1.76, the second width configured to be sufficiently narrow to allow an inner surface of the stretchable cuff to make frictional contact with a surface of the portable electronic device when the portable electronic device is inserted into or removed from the protective pouch through the elastic opening,
        a material having cleaning properties, and
        a minimum height between the first end and the second end to provide a sufficient amount of frictional contact with the surface of the portable electronic device when the portable electronic device is being inserted into or removed from the protective pouch through the elastic opening,
        wherein the stretchable cuff cleans the surface of the portable electronic device when the portable electronic device is being inserted into or removed from the protective pouch through the elastic opening, and wherein the frictional contact is sufficient to remove one or more of fingerprints, smudges, and oils from the surface of the portable electronic device.

2. The protective cleaning sleeve of claim 1, wherein the protective pouch is configured with dimensions to substantially enclose the portable electronic device.

3. The protective cleaning sleeve of claim 1, wherein the protective pouch is made from a single layer of fabric having cleaning properties to provide a cleaning function when the portable electronic device is inside the protective pouch.

4. The protective cleaning sleeve of claim 3, wherein the single layer of fabric includes one of the following: terry cloth, microfiber, micro-suede, terry velour, bamboo, rayon jersey or any other fabric having cleaning properties.

5. The protective cleaning sleeve of claim 3, wherein the single layer of fabric is stretchable as a result of containing a stretchable material within the fabric.

6. The protective cleaning sleeve of claim 5, wherein the stretchable material includes between 0.01% -99% of Lycra™, Elastane™, or other types of spandex materials.

7. The protective cleaning sleeve of claim 3, wherein the single layer of fabric is stretchable as a result of obtaining the single layer of fabric by cutting in a bias direction of the fabric.

8. The protective cleaning sleeve of claim 1, wherein the protective pouch is made from two layers of materials, which include an outer layer which is configured to provide a durable surface to protect the portable electronic device and an inner layer which is configured to provide a cleaning function when the portable electronic device is inside the protective pouch.

9. The protective cleaning sleeve of claim 8, wherein the outer layer is formed from a material capable of being decorated or embellished in order to personalize the protective cleaning sleeve for a user.

10. The protective cleaning sleeve of claim 8, wherein the outer layer is stretchable.

11. The protective cleaning sleeve of claim 8, wherein the inner layer is made from a fabric having cleaning properties to provide a cleaning function when the portable electronic device is inside the protective pouch.

12. The protective cleaning sleeve of claim 1, wherein the stretchable cuff is formed from a fabric, which contains a stretchable material.

13. The protective cleaning sleeve of claim 12, wherein the stretchable material includes between 0.01% -99% of Lycra™, Elastane™, or other types of spandex materials.

14. The protective cleaning sleeve of claim 1, wherein the material having cleaning properties in the stretchable cuff includes one of the following: terry cloth, microfiber, micro-suede, terry velour, bamboo, rayon jersey or any other fabric having cleaning properties.

15. The protective cleaning sleeve of claim 1, wherein a first half the stretchable cuff is made from a first fabric having the cleaning properties while a second half of the stretchable cuff is made from a second fabric without cleaning properties, wherein one of the first fabric or the second fabric is stretchable.

16. The protective cleaning sleeve of claim 1, wherein the ratio of the first width to the second width is determined based at least on a material composition of the stretchable cuff and a material composition of the protective pouch.

17. The protective cleaning sleeve of claim 1, further comprising an elastic loop attached at both ends to a portion of the protective cleaning sleeve and configured to hold an accessory of the portable electronic device.

18. The protective cleaning sleeve of claim 17, wherein the protective cleaning sleeve further includes a tie-on loop attached to the elastic loop and configured to affix an accessory of the portable electronic device to a surface of the protective cleaning sleeve.

19. The protective cleaning sleeve of claim 18, wherein the tie-on loop includes a cord tie.

20. The protective cleaning sleeve of claim 1, further comprising an external pocket attached to a surface of the protective pouch for storing a pen or a stylus used with the portable electronic device.

21. The protective cleaning sleeve of claim 1, wherein the portable electronic device includes one of: a mobile phone, a laptop computer, and a tablet computer.

22. The protective cleaning sleeve of claim 1, wherein the stretchable cuff is integrated with a closing mechanism for securely closing the elastic opening of the stretchable cuff.

23. The protective cleaning sleeve of claim 1, wherein the entire interior surface of the protective pouch is made with a cleaning material without stretch, wherein the cleaning material is cut on a bias.

24. A device for storing and cleaning a portable electronic device, comprising:
  a pouch comprising a first panel and a second panel, wherein the pouch has an opening and a first width which is substantially equal to the width of the portable electronic device; and
  a stretchable cuff comprising a first half cuff and a second half cuff and attached to the opening of the pouch, wherein the stretchable cuff has an elastic opening which has a second width substantially smaller than the width of the portable electronic device having a ratio of the first width to the second width between 1.1 and 1.76, the second width configured to be sufficiently narrow to allow an inner surface of the stretchable cuff to make frictional contact with a surface of the portable electronic device when the portable electronic device is inserted into or removed from the protective pouch through the elastic opening,
  wherein the first panel of the pouch and the first half cuff form a first side of the device and the second panel of the pouch and the second half cuff form a second side of the device, and
  wherein the first half cuff is made from a first fabric having cleaning properties so that the inner surface of the first half cuff cleans a surface of the portable electronic device when the portable electronic device is being inserted into or removed from the pouch through the elastic opening, and wherein the frictional contact is sufficient to remove one or more of fingerprints, smudges, and oils from the surface of the portable electronic device.

25. The device of claim 24, wherein the first fabric includes one of the following: terry cloth, microfiber, micro-suede, terry velour, bamboo, rayon jersey or any other fabric having cleaning properties.

26. The device of claim 24, wherein the inner surface of the first panel is made from a second fabric having cleaning properties so that the inner surface of the first side of the device cleans a surface of the portable electronic device when the portable electronic device is being inserted into or removed from the pouch through the elastic opening.

27. The device of claim 26, wherein the inner surface of the first panel is used as a cleaning cloth when the pouch is turned inside out and a user places a hand inside the inverted pouch to be used as a cleaning mitt.

28. The device of claim 26, wherein the second fabric includes one of the following: terry cloth, microfiber, micro-suede, terry velour, bamboo, rayon jersey or any other fabric having cleaning properties.

29. The device of claim 24, wherein the second half cuff is made from the first fabric having the cleaning properties.

30. The device of claim 24, wherein the second half cuff is made from a third fabric without cleaning properties.

31. The device of claim 24, wherein the inner surface of the first panel is made from a fourth fabric without cleaning properties.

32. The device of claim 24, further comprising a carrying case, which encloses both the pouch and the stretchable cuff.

* * * * *